(12) United States Patent
Takano

(10) Patent No.: US 9,545,967 B2
(45) Date of Patent: Jan. 17, 2017

(54) VEHICLE

(71) Applicant: Yamaha Hatsudoki Kabushiki Kaisha, Iwata-shi, Shizuoka (JP)

(72) Inventor: Kazuhisa Takano, Shizuoka (JP)

(73) Assignee: YAMAHA HATSUDOKI KABUSHIKI KAISHA, Shizuoka (JP)

( * ) Notice: Subject to any disclaimer, the term of this patent is extended or adjusted under 35 U.S.C. 154(b) by 0 days.

(21) Appl. No.: 14/652,832

(22) PCT Filed: Dec. 19, 2013

(86) PCT No.: PCT/JP2013/084146
§ 371 (c)(1),
(2) Date: Jun. 17, 2015

(87) PCT Pub. No.: WO2014/098197
PCT Pub. Date: Jun. 26, 2014

(65) Prior Publication Data
US 2016/0185413 A1 Jun. 30, 2016

(30) Foreign Application Priority Data

Dec. 19, 2012 (JP) .................. 2012-277219
Dec. 19, 2012 (JP) .................. 2012-277220
Jul. 1, 2013 (JP) .................. 2013-138484

(51) Int. Cl.
*B62K 5/10* (2013.01)
*B62K 5/05* (2013.01)
(Continued)

(52) U.S. Cl.
CPC ............... *B62K 5/10* (2013.01); *B62K 5/027* (2013.01); *B62K 5/05* (2013.01); *B62K 5/08* (2013.01); *B62K 21/00* (2013.01); *B62K 2202/00* (2013.01)

(58) Field of Classification Search
CPC ........... B62K 5/10; B62K 5/027; B62K 21/00; B62K 5/08; B62K 5/05
See application file for complete search history.

(56) References Cited

U.S. PATENT DOCUMENTS 4,740,004 A * 4/1988 McMullen ............... B62K 5/05
280/124.103
D547,242 S 7/2007 Lambri
(Continued)

FOREIGN PATENT DOCUMENTS

EP 1 155 950 A2 11/2001
EP 2 399 811 A1 12/2011
(Continued)

OTHER PUBLICATIONS

Sasaki et al.; "VEHICLE"; U.S. Appl. No. 14/901,356, filed Dec. 28, 2015.
(Continued)

*Primary Examiner* — Darlene P Condra
(74) *Attorney, Agent, or Firm* — Keating and Bennett, LLP

(57) ABSTRACT

A vehicle includes a vehicle body frame that can lean, a right front wheel and a left front wheel, and an upper cross portion and a lower cross portion of a link mechanism each including a right end portion, a left end portion, and a middle portion supported on the vehicle body frame. An upper right displacement and an upper left displacement that result when a rearward test force is exerted individually on a lower right portion and a lower left portion that support the lower cross portion with the lower cross portion removed are larger than a lower right displacement and a lower left displacement that result when a force that is equal or substantially equal in magnitude and direction as the forces exerted on the lower right and left portions is exerted individually on an
(Continued)

upper right portion and a upper left portion that support the upper cross member with the upper cross portion removed.

15 Claims, 10 Drawing Sheets

(51) Int. Cl.
  *B62K 21/00* (2006.01)
  *B62K 5/027* (2013.01)
  *B62K 5/08* (2006.01)

(56) References Cited

U.S. PATENT DOCUMENTS

| | | | |
|---|---|---|---|
| 8,991,542 B2* | 3/2015 | Yu | B62K 5/027 180/209 |
| 2004/0129473 A1* | 7/2004 | Talbot | B62J 1/12 180/210 |
| 2004/0140645 A1 | 7/2004 | Hayashi | |
| 2005/0012291 A1 | 1/2005 | Bagnoli | |
| 2005/0167174 A1 | 8/2005 | Marcacci | |
| 2008/0164085 A1* | 7/2008 | Cecinini | B60G 21/007 180/210 |
| 2012/0083973 A1* | 4/2012 | Araki | B62K 21/00 701/43 |
| 2013/0168944 A1 | 7/2013 | Bartolozzi et al. | |
| 2015/0142289 A1* | 5/2015 | Katoh | G05G 1/04 701/70 |

FOREIGN PATENT DOCUMENTS

| | | |
|---|---|---|
| JP | 2002-337779 A | 11/2002 |
| JP | 2004-359232 A | 12/2004 |
| JP | 2005-313876 A | 11/2005 |
| JP | 2011-195099 A | 10/2011 |
| WO | 2012/007819 A1 | 1/2012 |
| WO | 2015/002169 A1 | 1/2015 |

OTHER PUBLICATIONS

Takano; "VEHICLE"; U.S. Appl. No. 14/901,353, filed Dec. 28, 2015.
Takano; "VEHICLE"; U.S. Appl. No. 14/652,835, filed Jun. 17, 2015.
Takano; "VEHICLE"; U.S. Appl. No. 14/651,779, filed Jun. 12, 2015.
Official Communication issued in International Patent Application No. PCT/JP2013/084146, mailed on Apr. 1, 2014.
Piaggio, "Catalogo Parti Di Ricambio", NTRC000U01, MP3 300 ie LT Mod. ZAPM64102, 116 pages.
Official Communication issued in corresponding European Patent Application No. 13864190.7, mailed on Oct. 9, 2015.
Official Communication issued in corresponding European Patent Application No. 13864190.7, mailed on Oct. 30, 2015.

* cited by examiner

VEHICLE

BACKGROUND OF THE INVENTION

1. Field of the Invention

The present invention relates to a vehicle that includes a vehicle body frame that can lean and two front wheels.

2. Description of the Related Art

A known vehicle includes a vehicle body frame that leans to the left or right when the vehicle is cornering and two front wheels that are aligned in a left-and-right direction of the vehicle body frame (for example, refer to Japanese Patent Unexamined Publication JP-A-2005-313876, U.S. Design patent D547,242S and Catalogo partidi ricambio, MP3 300 LT Mod. ZAPM64102, Piaggio).

The vehicle including the vehicle body frame that can lean and two front wheels, also includes a link mechanism. The link mechanism includes an upper cross portion and a lower cross portion. In addition, the link mechanism also includes a right side portion which supports right end portions of the upper cross portion and the lower cross and a left side portion which supports left end portions of the upper cross portion and the lower cross portion. Middle portions of the upper cross portion and the lower cross portion are supported on the vehicle body frame directly forward of a steering shaft. The upper cross portion and the lower cross portion are supported on the vehicle body frame so as to turn about axes that extend substantially in a front-and-rear direction of the vehicle body frame. The upper cross portion and the lower cross portion turn relative to the vehicle body frame as the vehicle body frame leans, such that a relative position of the two front wheels in an up-and-down direction of the vehicle body frame changes. The upper cross portion and the lower cross portion are provided above the two front wheels in the up-and-down direction of the vehicle body frame when the vehicle body frame rests in an upright state.

The vehicle including the vehicle body frame that can lean and two front wheels includes a right shock absorbing device which supports the right front wheel so as to move in the up-and-down direction of the vehicle body frame and a left shock absorbing device which supports the left front wheel so as to move in the up-and-down direction of the vehicle body frame. The right shock absorbing device is supported on the right side portion so as to turn about an axis of the right side portion. The left shock absorbing device is supported on the left side portion so as to turn about an axis of the left side portion. The vehicles described in Japanese Patent Unexamined Publication JP-A-2005-313876 and U.S. Design patent D547,242S include a handlebar, a steering shaft, and a turning transmission mechanism. The handlebar is fixed to the steering shaft. The steering shaft is supported on the vehicle body frame so as to turn relative thereto. When the handlebar is turned, the steering shaft also turns. The turning transmission mechanism transfers the turning motion of the steering shaft to the right shock absorbing device and the left shock absorbing device.

The vehicle including the vehicle body frame that can lean and two front wheels includes many on-board components provided on the periphery of the steering shaft. The on-board components include lamps such as a headlamp, a radiator, a reservoir tank, electric components such as a horn, and a main switch of the vehicle, a storage box, a storage pocket and the like.

In the vehicles described in Japanese Patent Unexamined Publication JP-A-2005-313876 and U.S. Design patent D547,242S, loads received by the right front wheel and the left front wheel are transferred to the link mechanism by way of the right shock absorbing device or the left shock absorbing device. The loads are transferred to the right side portion or the left side portion from the right shock absorbing device or the left shock absorbing device. The loads are transferred to the upper cross portion and the lower cross portion from the right side portion or the left side portion. The loads are transferred further to the vehicle body frame that is positioned on the periphery of the steering shaft from the upper cross portion and the lower cross portion. The link mechanism includes bearings provided between the right side portion or the left side portion and the upper cross portion and the lower cross portion and bearings provided between the upper cross portion and the lower cross portion and the vehicle body frame. These bearings enable the right side portion or the left side portion to turn smoothly relative to the upper cross portion and the lower cross portion and the upper cross portion and the lower cross portion to turn smoothly relative to the vehicle body frame. The bearings also transfer the loads received by the link mechanism to the vehicle body frame. Additionally, the right side portion, the left side portion, the upper cross portion, and the lower cross portion are each highly rigid members in order to enhance the function of turning smoothly and the function of transferring the loads. This enlarges the external size of the right side portion, the left side portion, the upper cross portion, and the lower cross portion. This results in enlargement of the link mechanism including those portions. Further, enlargement of the link mechanism results in a further expansion of the movable range of the link mechanism.

The vehicles described in Japanese Patent Unexamined Publication JP-A-2005-313876 and U.S. Design patent D547,242S include the link mechanism provided on the periphery of the steering shaft so as to move as the vehicle body frame leans. Because of this, in the vehicle including the vehicle body frame that can lean and two front wheels, it is required that interference of the movable range of the link mechanism with the on-board components is avoided. This requires enhancing the degree of freedom when designing the link mechanism in the vehicle that includes the vehicle body frame that can lean and the two front wheels.

SUMMARY OF THE INVENTION

Preferred embodiments of the present invention provide a vehicle including a vehicle body frame that can lean and two front wheels that enhances the degree of freedom when designing a link mechanism while maintaining the function of the link mechanism.

A vehicle that is driven by power from a power source includes a vehicle body frame; a left front wheel and a right front wheel disposed side by side in a left-and-right direction as seen from a front of the vehicle and that are steerable; a right shock absorbing device that supports the right front wheel at a lower portion thereof and configured to absorb an upward displacement of the right front wheel in an up-and-down direction of the vehicle body frame; a left shock absorbing device that supports the left front wheel at a lower portion thereof and configured to absorb an upward displacement of the left front wheel in the up-and-down direction of a vehicle body frame; a link mechanism including a right side portion that supports an upper portion of the right shock absorbing device so as turn about a right steering axis that extends in the up-and-down direction of the vehicle body frame; a left side portion that supports an upper portion of the left shock absorbing device so as to turn about a left steering axis that is parallel or substantially parallel to the right steering axis; an upper cross portion that includes a right end portion that supports an upper portion of the right side portion so as to turn about an upper right axis that extends in a front-and-rear direction of the vehicle body frame via an upper right bearing, a left end portion that supports an upper portion of the left side portion so as to turn about an upper left axis that is parallel or substantially parallel to the upper right axis via an upper left bearing, and a middle portion that is supported on the vehicle body frame so as to turn about an upper middle axis that is parallel or substantially parallel to the upper right axis and the upper left axis via an upper middle bearing; and a lower cross portion that includes a right end portion that supports a lower portion of the right side portion so as to turn about a lower right axis that is parallel or substantially parallel to the upper right axis via a lower right bearing, a left end portion that supports a lower portion of the left side portion so as to turn about a lower left axis that is parallel or substantially parallel to the upper left axis via a lower left bearing, and a middle portion that is supported on the vehicle body frame so as to turn about a lower middle axis that is parallel or substantially parallel to the upper middle axis via a lower middle bearing; a steering shaft supported on the vehicle body frame between the right side portion and the left side portion in a left-and-right direction of the vehicle body frame, and including an upper end portion provided above the lower middle axis in the up-and-down direction of the vehicle body frame and that is turnable about a middle steering axis that extends in the up-and-down direction of the vehicle body frame; a handlebar provided at the upper portion of the steering shaft; and a turning transmission mechanism configured to transfer a turn motion of the steering shaft to the right shock absorbing device and the left shock absorbing device according to an operation of the handlebar; wherein with the lower cross portion removed and the upper cross portion mounted, an upper right displacement of the upper cross portion that results when a forward or rearward test force in the direction of the lower right axis is exerted on the lower portion of the right side portion and an upper left displacement of the upper cross portion that results when a force that is equal or substantially equal in magnitude and direction as the test force is exerted on the lower portion of the left side portion are equal or substantially equal to each other; with the upper cross portion removed and the lower cross portion mounted, a lower right displacement of the lower cross portion that results when a force that is equal or substantially equal in magnitude and direction as the test force is exerted on the upper portion of the right side portion and a lower left displacement of the lower cross portion that results when a force that is equal or substantially equal as in magnitude and direction as the test force is exerted on the upper portion of the left side portion are equal or substantially equal to each other; the upper right displacement of the upper cross portion is larger than the lower right displacement of the lower cross portion; and the upper left displacement of the upper cross portion is larger than the lower left displacement of the lower cross portion.

The right side portion, the left side portion, the upper cross portion, and the lower cross portion of the link mechanism are each highly rigid to enhance the function of turning smoothly and the function to transferring loads. This increases the external size of the right side portion, the left side portion, the upper cross portion, and the lower cross portion. This results in enlargement of the link mechanism including those portions. Further, enlargement of the link mechanism results in a further expansion of the movable range of the link mechanism. The vehicle that includes the vehicle body frame that can lean and two front wheels includes the large link mechanism on the periphery of the steering shaft and that moves as the vehicle body frame leans. Because of this, in the vehicle including the vehicle body frame that can lean and two front wheels, the on-board components need to be arranged so that the on-board components do not interfere with the movable range of the link mechanism. This requires enhancing the degree of freedom in designing the link mechanism in the vehicle that includes the vehicle body frame that can lean and two front wheels.

A detailed analysis has been carried out on the function of the link mechanism. The link mechanism includes the function of enabling the right side portion or the left side portion to turn smoothly relative to the upper cross portion and the lower cross portion and the function of enabling the upper cross portion and the lower cross portion to turn smoothly relative to the vehicle body frame. Additionally, the link mechanism includes the function of transferring loads received by the right side portion or the left side portion to the vehicle body frame.

This analysis has revealed that the upper cross portion and the lower cross portion are twisted by the loads received by the link mechanism. The analysis has revealed that the twisting of the upper cross portion occurs along an upper center axis that passes through a center of the upper right bearing of the upper cross member in the direction of the upper right axis and a center of the upper left bearing of the upper cross member in the direction of the upper left axis. The analysis has also revealed that the twisting of the lower cross portion occurs along a lower center axis that passes through a center of the lower right bearing of the lower cross member in the direction of the lower right axis and a center of the lower left bearing of the lower cross member in the direction of the lower left axis.

Various cross portions that are different in torsional rigidity about the upper center axis and in torsional rigidity about the lower center axis have been studied. The results of the study have revealed that even though the torsional rigidity of the upper cross portion is made to differ from the torsional rigidity of the lower cross portion, when the torsional rigidity of the lower cross portion is made higher than the torsional rigidity of the upper cross portion, the smooth operation of the link mechanism is easily maintained. It is considered that this is attributed to the fact that a difference between a distance between an axle of the right front wheel and the upper right bearing located between the upper cross portion and the right side portion and a distance between the axle of the right front wheel and the lower right bearing located between the lower cross portion and the right side portion differs from a difference between a distance between an axle of the left front wheel and the upper left bearing located between the upper cross portion and the left side portion and a distance between the axle of the left front wheel and the lower left bearing located between the lower cross portion and the left side portion. The distance between the axle of the right front wheel and the lower right bearing located between the lower cross portion and the right side portion is shorter than the distance between the axle of the right front wheel and the upper right bearing located between the upper cross portion and the right side portion. The distance between the axle of the left front wheel and the lower left bearing located between the lower cross portion and the left side portion is shorter than the distance between the axle of the left front wheel and the upper left bearing located between the upper cross portion and the left side portion. It is considered that these factors affect the smooth operation of the link mechanism.

According to a preferred embodiment of the present invention, the torsional rigidity of the lower cross portion is higher than the torsional rigidity of the upper cross portion. Therefore, smooth operation of the link mechanism is easily maintained. Moreover, the upper cross portion and the lower cross portion each include the right end portion, the left end portion, and the middle portion thereof, and the torsional rigidity of the upper cross portion is made to differ from the torsional rigidity of the lower cross portion. Therefore, it is possible to enhance the degree of freedom in designing the link mechanism.

Consequently, it is possible to enhance the degree of freedom in designing the link mechanism while maintaining the function of the link mechanism in the vehicle that includes the vehicle body frame that can lean and two front wheels.

In a vehicle according to a preferred embodiment of the present invention, a shape of the upper cross portion is preferably different from a shape of the lower cross portion.

According to a preferred embodiment of the present invention, the movable range of the link mechanism is changed from a simple shape like a rectangular parallelepiped to an arbitrary shape by making the shape of the upper cross portion differ from the shape of the lower cross portion. This makes it easy to avoid interference of the movable range of the link mechanism with the on-board components. Consequently, it is possible to enhance the degree of freedom in designing the link mechanism while maintaining the function of the link mechanism in the vehicle that includes the vehicle body frame that can lean and two front wheels.

In a vehicle according to a preferred embodiment of the present invention, a shape of the upper cross portion is preferably smaller than a shape of the lower cross portion.

According to a preferred embodiment of the present invention, the movable range of the link mechanism is changed from the simple shape like a rectangular parallelepiped to a shape in which an upper portion is small by making the shape of the upper cross portion smaller than the shape of the lower cross portion. This makes it easy to avoid interference of the movable range of the link mechanism with the on-board components. Consequently, it is possible to enhance the degree of freedom in designing the link mechanism while maintaining the function of the link mechanism in the vehicle that includes the vehicle body frame that can lean and two front wheels.

In a vehicle according a preferred embodiment of the present invention, a volume of the upper cross portion is preferably different from a volume of the lower cross portion.

According to a vehicle of a preferred embodiment of the present invention, the movable range of the link mechanism is changed from the simple shape like a rectangular parallelepiped to an arbitrary shape by making the volume of the upper cross portion differ from the volume of the lower cross portion. This makes it easy to avoid interference of the movable range of the link mechanism with the on-board components. Consequently, it is possible to enhance the degree of freedom in designing the link mechanism while maintaining the function of the link mechanism in the vehicle that includes the vehicle body frame that can lean and two front wheels.

In a vehicle according to a preferred embodiment of the present invention, a volume of the upper cross portion is preferably smaller than a volume of the lower cross portion.

According to a vehicle of a preferred embodiment of the present invention, the movable range of the link mechanism is changed from the simple shape like a rectangular parallelepiped to a shape in which an upper portion is small by making the volume of the upper cross portion smaller than the volume of the lower cross portion. This makes it easy to avoid interference of the movable range of the link mechanism with the on-board components. Consequently, it is possible to enhance the degree of freedom in designing the link mechanism while maintaining the function of the link mechanism in the vehicle that includes the vehicle body frame that can lean and two front wheels.

In a vehicle according to a preferred embodiment of the present invention, a material of the upper cross portion is preferably identical to a material of the lower cross portion.

According to a vehicle of a preferred embodiment of the present invention, the balance between rigidity and shape is easily controlled by making the volume of the upper cross portion differ from the volume of the lower cross portion. This makes it easy to avoid interference of the movable range of the link mechanism with the on-board components. Consequently, it is possible to enhance the degree of freedom in designing the link mechanism while maintaining the function of the link mechanism in the vehicle that includes the vehicle body frame that can lean and two front wheels.

In a vehicle according to a preferred embodiment of the present invention, a material of the upper cross portion is preferably different from a material of the lower cross portion.

According to a vehicle of a preferred embodiment of the present invention, the material of the upper cross portion or the lower cross portion is preferably different from that of the other, and therefore, a controlling range of the balance between rigidity and shape is expanded. For example, when the upper cross portion whose rigidity is smaller than that of the lower cross portion is made from a material having high rigidity, the shape of the upper cross portion is small. This makes it easy to avoid interference of the movable range of the link mechanism with the on-board components. Consequently, it is possible to enhance the degree of freedom in designing the link mechanism while maintaining the function of the link mechanism in the vehicle that includes the vehicle body frame that can lean and two front wheels.

In a vehicle according to a preferred embodiment of the present invention, the vehicle body frame preferably includes a link supporting portion that turnably supports the upper cross portion and the lower cross portion, and a shape of a front portion of the upper cross portion located forward of the link supporting portion in the direction of the upper right axis is preferably different from a shape of a rear portion of the upper cross portion located rearward of the link supporting portion.

According to a vehicle of a preferred embodiment of the present invention that includes the vehicle body frame that can lean and two front wheels, the shape of the front portion of the upper cross portion located forward of the link supporting portion is made to differ from the shape of the rear portion of the upper cross portion located rearward of the link supporting portion, and therefore, the movable range of the link mechanism is changed from the simple shape like a rectangular parallelepiped to an arbitrary shape. This makes it easy to avoid interference of the movable range of the link mechanism with the on-board components. Consequently, it is possible to enhance the degree of freedom in designing the link mechanism while maintaining the function of the link mechanism in the vehicle that includes the vehicle body frame that can lean and two front wheels.

In the vehicle according to a preferred embodiment of the present invention, the vehicle body frame preferably includes a link supporting portion that turnably supports the upper cross portion and the lower cross portion, and a shape of a front portion of the lower cross portion located forward of the link supporting portion in the direction of the lower right axis is preferably different from a shape of a rear portion of the lower cross portion located rearward of the link supporting portion.

According to a vehicle of a preferred embodiment of the present invention that includes the vehicle body frame that can lean and two front wheels, the shape of the front portion of the lower cross portion located forward of the link supporting portion is made to differ from the shape of the rear portion of the lower cross portion located rearward of the link supporting portion, and therefore, the movable range of the link mechanism is changed from the simple shape like a rectangular parallelepiped to an arbitrary shape. This makes it easy to avoid interference of the movable range of the link mechanism with the on-board components. Consequently, it is possible to enhance the degree of freedom in designing the link mechanism while maintaining the function of the link mechanism in the vehicle that includes the vehicle body frame that can lean and two front wheels.

In a vehicle according to a preferred embodiment of the present invention, the vehicle body frame preferably includes a link supporting portion and the lower cross portion, and the upper cross portion preferably includes an upper front portion located forward of the link supporting portion in the direction of the upper right axis, which is supported at the right end portion and the left end portion and that is supported at the middle portion, and an upper rear portion located rearward of the link supporting portion in the direction of the upper right axis, which is supported at the right end portion and the left end portion and that is supported at the middle portion.

According to a vehicle of a preferred embodiment of the present invention that includes the vehicle body frame that can lean and two front wheels, the upper cross portion includes the upper front portion located forward of the link supporting portion and the upper rear portion located rearward of the link supporting portion, and therefore, the balance between rigidity and shape of the upper cross portion is easily controlled. This enhances the degree of freedom in designing a peripheral lower portion of the steering shaft. This makes it easy to avoid interference of the movable range of the link mechanism with the on-board components. Consequently, it is possible to enhance the degree of freedom in designing the link mechanism while maintaining the function of the link mechanism in the vehicle that includes the vehicle body frame that can lean and two front wheels.

In a vehicle according to a preferred embodiment of the present invention, the vehicle body frame preferably includes a link supporting portion that turnably supports the upper cross portion and the lower cross portion, and the lower cross portion preferably includes a lower front portion located forward of the link supporting portion in the direction of the lower right axis, which is supported at the right end portion and the left end portion and that is supported at the middle portion, and a lower rear portion located rearward of the link supporting portion in the direction of the lower right axis, which is supported at the right end portion and the left end portion and that is supported at the middle portion.

According to a vehicle of a preferred embodiment of the present invention that includes the vehicle body frame that can lean and two front wheels, the lower cross portion includes the lower front portion located forward of the link supporting portion and the lower rear portion located rearward of the link supporting portion, and therefore, the balance between rigidity and shape of the lower cross portion is easily controlled. This enhances the degree of freedom in designing a peripheral lower portion of the steering shaft. This makes it easy to avoid interference of the movable range of the link mechanism with the on-board components. Consequently, it is possible to enhance the degree of freedom in designing the link mechanism while maintaining the function of the link mechanism in the vehicle that includes the vehicle body frame that can lean and two front wheels.

In a vehicle according to a preferred embodiment of the present invention, the vehicle body frame preferably includes a link supporting portion that turnably supports the upper cross portion and the lower cross portion, and the upper cross portion or the lower cross portion are preferably provided only either forward of or rearward of the link supporting portion and are preferably not provided both forward of and rearward of the link supporting portion.

According to a vehicle of a preferred embodiment of the present invention that includes the vehicle body frame that can lean and two front wheels, the upper cross portion or the lower cross portion is provided only either forward of or rearward of the link supporting portion, and therefore, the movable range of the link mechanism is changed from the simple shape like a rectangular parallelepiped to an irregular shape in which an upper portion is smaller than a lower portion. This makes it easy to avoid interference of the movable range of the link mechanism with the on-board components. Consequently, it is possible to enhance the degree of freedom in designing the link mechanism while maintaining the function of the link mechanism in the vehicle that includes the vehicle body frame that can lean and two front wheels.

In a vehicle according to a preferred embodiment of the present invention, a front end of the upper cross portion and a front end of the lower cross portion are preferably provided in different positions in relation to the direction of the upper right axis.

According to a vehicle that includes the vehicle body frame that can lean and the two front wheels in a preferred embodiment of the present invention, the front end of the upper cross portion and the front end of the lower cross portion are provided in different positions in relation to the direction of the upper right axis, and therefore, the movable range of the link mechanism is changed from the simple shape like a rectangular parallelepiped to a shape that is irregular in relation to a front-and-rear direction of the vehicle body frame. This makes it easy to avoid interference of the movable range of the link mechanism with the on-board components. Consequently, it is possible to enhance the degree of freedom in designing the link mechanism while maintaining the function of the link mechanism in the vehicle that includes the vehicle body frame that can lean and two front wheels.

In a vehicle according to a preferred embodiment of the present invention, a rear end of the upper cross portion and a rear end of the lower cross portion are preferably provided in different positions in relation to the direction of the upper right axis.

According to a vehicle of a preferred embodiment of the present invention, the rear end of the upper cross portion and the rear end of the lower cross portion are provided in different positions in relation to the direction of the upper right axis, and therefore, the movable range of the link mechanism is changed from the simple shape like a rectangular parallelepiped to the shape that is irregular in relation to the front-and-rear direction of the vehicle body frame. This makes it easy to avoid interference of the movable range of the link mechanism with the on-board components. Consequently, it is possible to enhance the degree of freedom in designing the link mechanism while maintaining the function of the link mechanism in the vehicle that includes the vehicle body frame that can lean and two front wheels.

In a vehicle according to a preferred embodiment of the present invention, the vehicle body frame preferably includes a link supporting portion that turnably supports the upper cross portion and the lower cross portion, and the link supporting portion may turnably support the steering shaft.

According to a vehicle of a preferred embodiment of the present invention that includes the vehicle body frame that can lean and two front wheels, the link supporting portion supports the link mechanism that supports the right front wheel, the left front wheel, the right shock absorbing device, and the left shock absorbing device and is highly rigid. This makes it easy to avoid interference of the movable range of the link mechanism with the on-board components. Consequently, it is possible to enhance the degree of freedom in designing the link mechanism while maintaining the function of the link mechanism in the vehicle that includes the vehicle body frame that can lean and two front wheels.

According to a vehicle of a preferred embodiment of the present invention that includes the vehicle body frame that can lean and two front wheels, it is possible to enhance the degree of freedom in designing the link mechanism while maintaining the function of the link mechanism.

The above and other elements, features, steps, characteristics and advantages of the present invention will become more apparent from the following detailed description of the preferred embodiments with reference to the attached drawings.

DETAILED DESCRIPTION OF THE PREFERRED EMBODIMENTS

Figure 1:
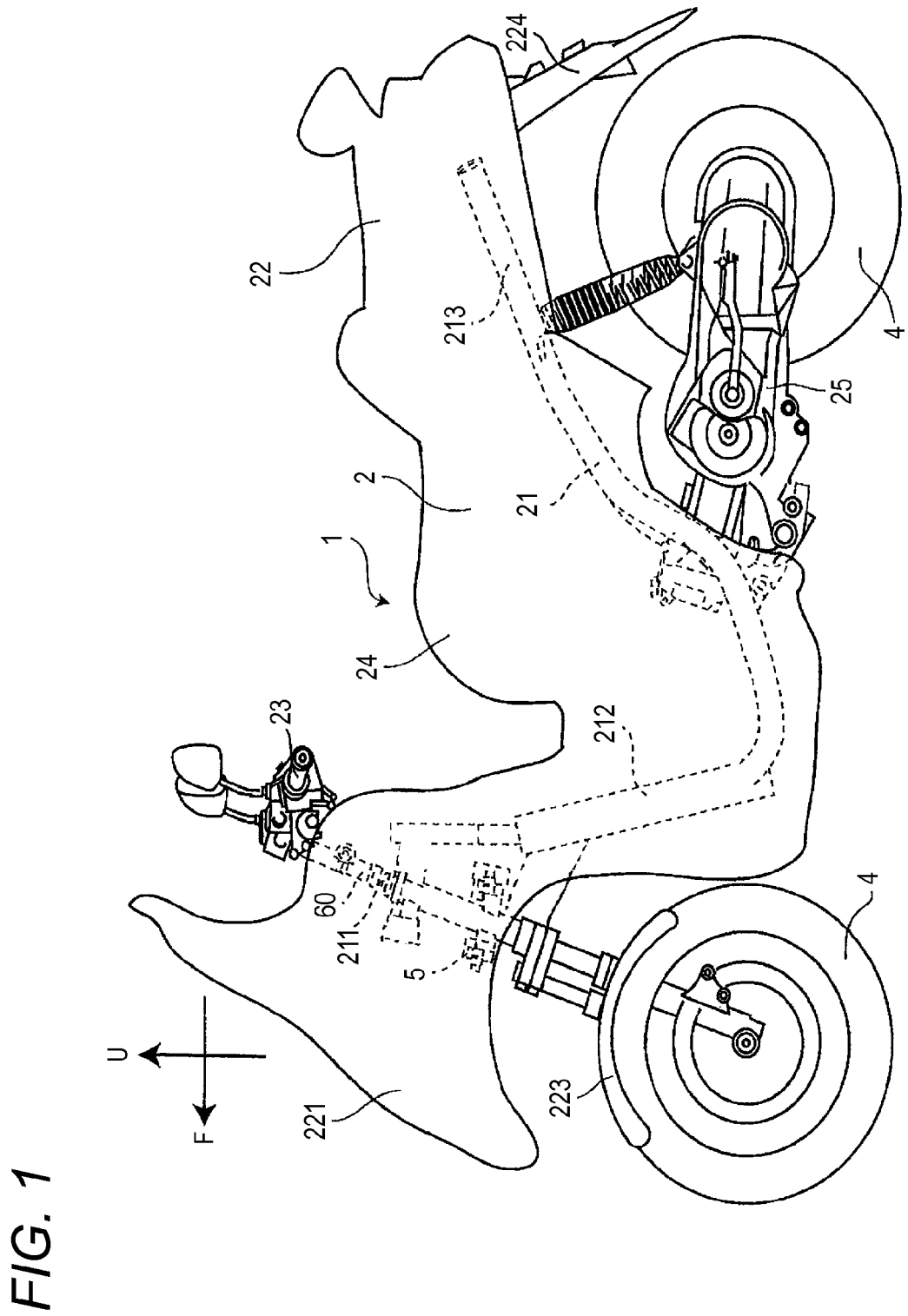
FIG. 1 is a left side view of a vehicle according to a preferred embodiment of the present invention.

Hereinafter, a vehicle 1 which is one type of a vehicle according to a preferred embodiment of the present invention will be described with reference to the drawings. In the drawings, like reference numerals are given to like or corresponding portions and the description thereof will not be made repeatedly.

In the following description, an arrow F in the drawings denotes a forward direction of the vehicle 1. An arrow R in the drawings denotes a rightward direction of a vehicle body frame of the vehicle 1. An arrow L in the drawings denotes a leftward direction of the vehicle body frame of the vehicle 1. An arrow U denotes a perpendicularly upward direction. A transversely middle position indicates a central position in the direction of a width of the vehicle as seen from the front. A transversely lateral direction of the vehicle indicates a leftward or rightward direction from the transversely middle position.

FIG. 1 is a schematic overall side view of the vehicle 1. In the following description, when front, rear, left, and right are referred to in indicating directions, they denote front, rear, left, and right as seen from a rider who rides on the vehicle 1.

The vehicle 1 includes a vehicle main body 2, front wheels 3, and a rear wheel 4. The vehicle main body 2 includes a vehicle body frame 21, a body cover 22, a handlebar 23, a seat 24, and a power unit 25.

The vehicle body frame 21 supports the power unit 25, the seat 24 and the like. The power unit 25 includes a power source such as an engine or an electric motor, a transmission and the like. In FIG. 1, the vehicle body frame 21 is shown by broken lines.

The vehicle body frame 21 includes a headstock 211, a front frame 212, and a rear frame 213. The headstock 211 is disposed at a front portion of the vehicle. A link mechanism 5 is disposed around the periphery of the headstock 211.

A steering shaft 60 is inserted into the headstock 211 so as to turn therein. The steering shaft 60 extends in an up-and-down direction. The handlebar 23 is mounted on an upper end of the steering shaft 60. The front frame 212 is inclined obliquely downward from a front end thereof to the rear. The front frame 212 is connected to the headstock 211 in a position located rearward of an upper cross portion 51, which will be described below. The rear frame 213 supports the seat 24 and a tail lamp.

The vehicle body frame 21 is covered by the body cover 22. The body cover 22 includes a front cover 221, front mudguards 223, and a rear mudguard 224.

The front cover 221 is positioned forward of the seat 24. The front cover 221 covers the headstock 211 and the link mechanism 5.

The front mudguards 223 are provided individually directly above a pair of left and right front wheels 3. The front mudguards 223 are disposed directly below the front cover 221. The rear mudguard 224 is disposed directly above the rear wheel 4.

The front wheels 3 are disposed below the headstock 211 and the link mechanism 5. The front wheels 3 are disposed directly below the front cover 221.

Figure 2:
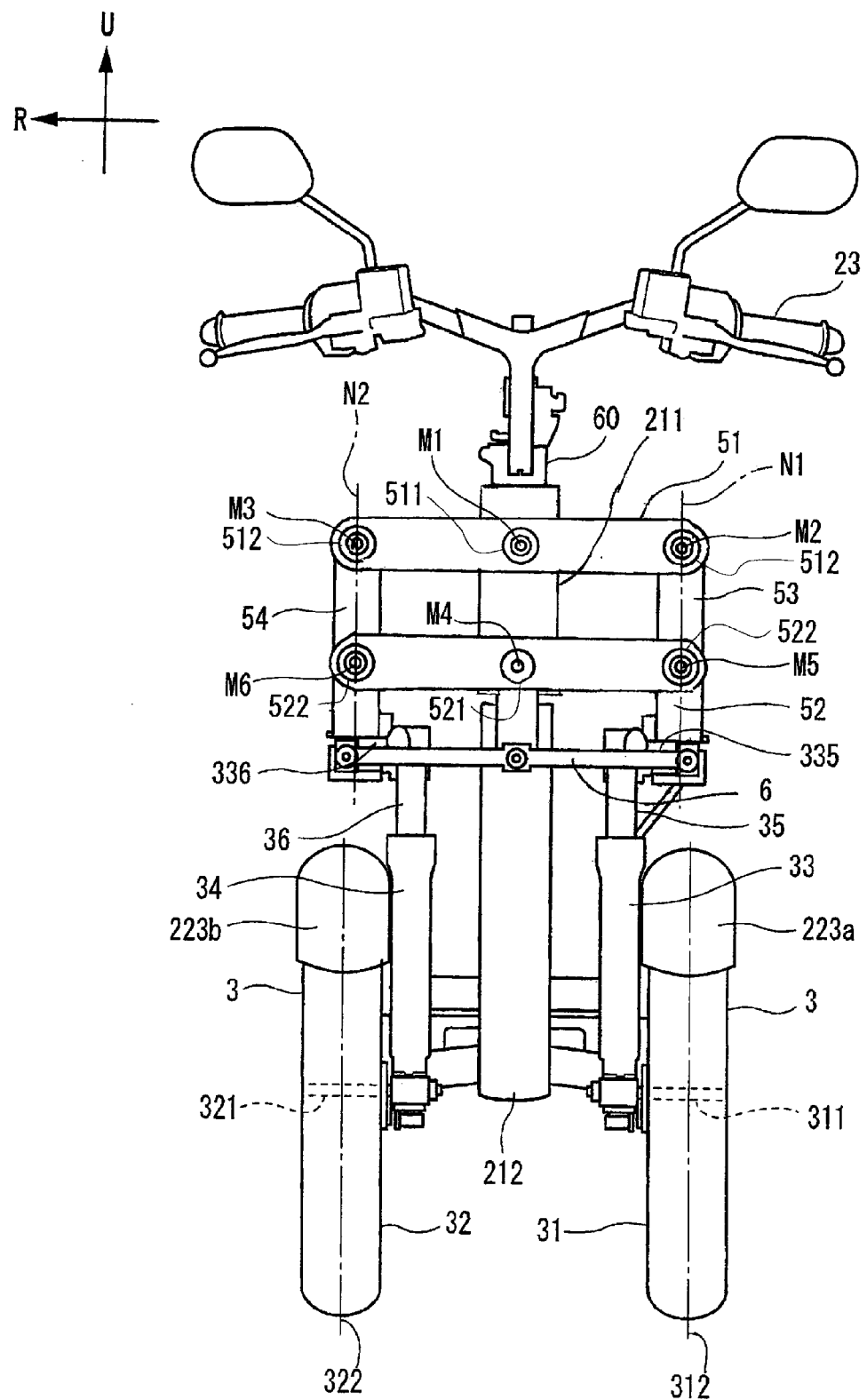
FIG. 2 is an overall front view of the vehicle with a body cover removed.

FIG. 2 is an overall front view of the vehicle 1 with the body cover 22 removed. In FIG. 2, the front frame 212 and the like are omitted from the illustration.

The vehicle 1 includes the handlebar 23, the steering shaft 60, the headstock 211, the pair of left and front wheels 3, and the link mechanism 5. The link mechanism 5 is disposed around the periphery of the headstock 211. The link mechanism 5 is connected to the pair of left and right front wheels 3, that is, a left front wheel 31 and a right front wheel 32. Additionally, the link mechanism 5 is turnably mounted on the headstock 211. The link mechanism 5 includes the upper cross portion 51, a lower cross portion 52, a left side portion 53, a right side portion 54, a first bracket 335, a second bracket 336, a left shock absorber 33, a right shock absorber 34, and a tie-rod 6.

The front wheels 3 are aligned side by side in a left-and-right direction of the vehicle body frame 21 and include the left front wheel 31 and the right front wheel 32 that are steered. A left front mudguard 223a is disposed directly above the left front wheel 31. A right front mudguard 223b is disposed directly above the right front wheel 32. The right front wheel 32 is disposed symmetrically with the left front wheel 31 with respect to the headstock 211 in relation to the left-and-right direction of the vehicle body frame 21.

Figure 5:
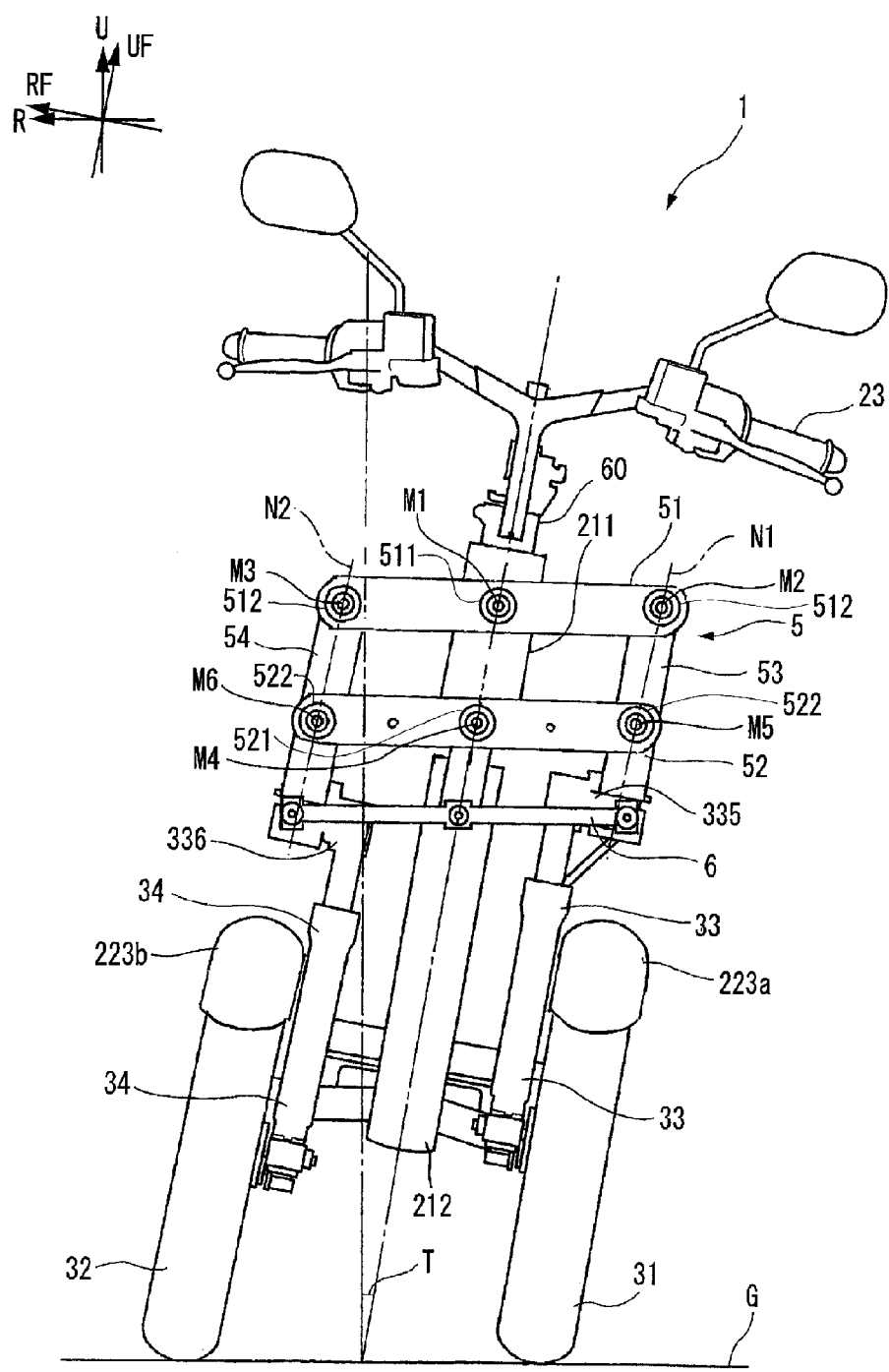
FIG. 5 is an overall front view showing a state in which the vehicle is caused to lean.

When referred to in this description, a "rightward direction RF of the vehicle body frame 21" denotes a rightward direction that intersects an axial direction of the headstock 211 perpendicularly or substantially perpendicularly when the vehicle 1 is seen from the front. Additionally, an upward direction UF of the vehicle body frame 21 denotes an upward direction of the vehicle body frame 21 when the vehicle 1 rests upright. For example, the upward direction of the vehicle body frame 21 coincides with an axial direction of the headstock 211 when the vehicle 1 is seen from the front. When the vehicle 1 rests in an upright state as shown in FIG. 2, the rightward direction RF of the vehicle body frame 21 coincides with a rightward direction R in the horizontal direction. Because of this, only the rightward direction R in the horizontal direction is shown in FIG. 2. When the vehicle 1 leans relative to a road surface G as shown in FIG. 5, the rightward direction RF of the vehicle body frame 21 does not coincide with the rightward direction R in the horizontal direction, and the upward direction UF of the vehicle body frame 21 does not coincide with an upward direction U in a perpendicular direction.

The left front wheel 31 is connected to the left shock absorber 33. The left front wheel 31 is connected to a lower portion of the left shock absorber 33. The left front wheel 31 rotates about a rotational axis 311. The rotational axis 311 extends in the left-and-right direction of the vehicle body frame 21. The left front wheel 31 turns about a turning axis 312. The vehicle 1 changes its traveling direction as a result of the left front wheel 31 turning about the turning axis 312.

The right front wheel 32 is connected to the right shock absorber 34. The right front wheel 32 is connected to a lower portion of the right shock absorber 34. The right front wheel 32 rotates about a rotational axis 321. The rotational axis 321 extends in the left-and-right direction of the vehicle body frame 21. The right front wheel 32 turns about a turning axis 322. The vehicle 1 changes its traveling direction as a result of the right front wheel 32 turning about the turning axis 322.

The left shock absorber 33 absorbs impacts exerted on the left front wheel 31. The left shock absorber 33 is disposed below the link mechanism 5 in relation to the up-and-down direction of the vehicle body frame 21. The left shock absorber 33 is provided between the left side portion 53 (refer to FIG. 3), which will be described below, and the left front wheel 31. The left shock absorber 33 extends along a left steering axis N1 that extends in a direction in which the steering shaft 60 and the headstock 211 extend. The left shock absorber 33 is disposed to the left of the headstock 211 in relation to the left-and-right direction of the vehicle body frame 21. The left shock absorber 33 is disposed to the right of the left front wheel 31 in relation to the left-and-right direction of the vehicle body frame 21.

The right shock absorber 34 absorbs impacts exerted on the right front wheel 32. The right shock absorber 34 is disposed below the link mechanism 5 in relation to the up-and-down direction of the vehicle body frame 21. The right shock absorber 34 is provided between the right side portion 54 (refer to FIG. 3), which will be described below, and the right front wheel 32. The right shock absorber 34 extends along a right steering axis N2 in which the steering shaft 60 and the headstock 211 extend. The right shock absorber 34 is disposed to the right of the headstock 211 in relation to the left-and-right direction of the vehicle body frame 21. The right shock absorber 34 is disposed to the left of the right front wheel 32 in relation to the left-and-right direction of the vehicle body frame 21.

The tie-rod 6 transfers a turning motion of the handlebar 23 to the left front wheel 31 and the right front wheel 32. By doing so, the left front wheel 31 and the right front wheel 32 are steered by the handlebar 23. The tie-rod 6 is provided forward of the headstock 211. The tie-rod 6 extends in the left-and-right direction of the vehicle body frame 21. The tie-rod 6 is disposed directly below the lower cross portion 52, which will be described below, and directly above the left front wheel 31 and the right front wheel 32 in relation to the up-and-down direction of the vehicle body frame 21. The tie-rod 6 is connected to a lower end portion of the steering shaft 60. When the steering shaft 60 is turned, the tie-rod 6 moves laterally to the left or right.

Figure 3:
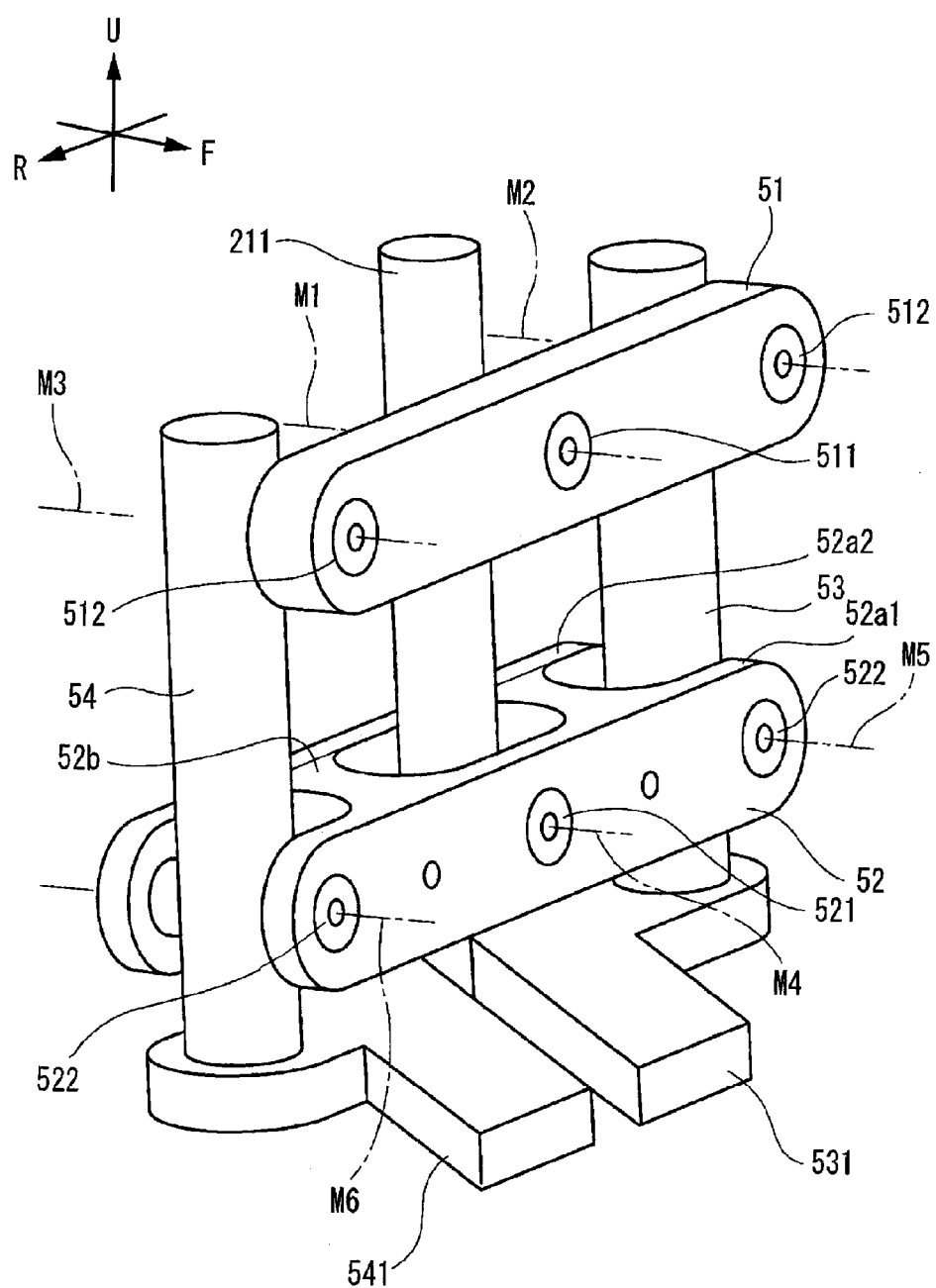
FIG. 3 is a perspective view of a link mechanism.

FIG. 3 is a perspective view of the link mechanism 5 with the left shock absorber 33 and the right shock absorber 34 omitted from the illustration.

The left side portion 53 is disposed to the left of the headstock 211 in relation to the left-and-right direction of the vehicle body frame 21. The right side portion 54 is disposed to the right of the headstock 211 in relation to the left-and-right direction of the vehicle body frame 21. The left side portion 53 and the right side portion 54 are preferably cylindrical or substantially cylindrical members.

The left side portion 53 and the right side portion 54 extend in the up-and-down direction with the vehicle resting in the upright state. A mounting piece 531 where the left shock absorber 33 is mounted is provided at a lower end of the left side portion 53. A lower portion of the left side portion 53 supports the left shock absorber 33 so as to turn about the left steering axis N1.

A mounting piece 541 where the right shock absorber 34 is mounted is provided at a lower end of the right side portion 54. A lower portion of the right side portion 54 supports the right shock absorber 34 so as to turn about the right steering axis N2.

In the present preferred embodiment, the upper cross portion 51 includes a single plate-shaped portion that extends in the left-and-right direction when seen from the front of the vehicle. The upper cross portion 51 is arranged forward of the headstock 211 toward the front of the vehicle. The upper cross portion 51 includes an upper middle bearing 511 at a middle portion of the upper cross portion 51 in relation to the left-and-right direction of the vehicle body frame 21 and an upper left bearing 512 and an upper right bearing 512 at or near leftmost and rightmost portions of the upper cross portion 51 in relation to the left-and-right direction of the vehicle body frame 21. An upper middle axis M1 that is a turning center of the upper middle bearing 511, an upper left axis M2 that is a turning center of the upper left bearing 512, and an upper right axis M3 that is a turning center of the upper right axis 512 are parallel or substantially parallel to one another.

The upper cross portion 51 is mounted on the headstock 211 via the upper middle bearing 511. This allows the upper cross portion 51 to be supported on the headstock 211 so as to turn about the upper middle axis M1 relative to the headstock 211.

The upper cross portion 51 is connected to an upper portion of the left side portion 53 and an upper portion of the right side portion 54 via the upper left bearing 512 and the upper right bearing 512, respectively. This allows the upper cross portion 51 to turn about the upper left axis M2 and the upper right axis M3 relative to the left side portion 53 and the right side portion 54, respectively.

In the present preferred embodiment, the upper cross portion 51 includes a single portion that supports the upper portion of the right side portion 54 at a right end portion thereof so as to turn about the upper right axis M3 that extends in a front-and-rear direction of the vehicle body frame 21 via the upper right bearing 512 and supports the upper portion of the left side portion 53 at a left end portion thereof so as to turn about the upper left axis M2 that is parallel or substantially parallel to the upper right axis M3 via the upper left bearing 512 and that is supported on the vehicle body frame 21 at the middle portion thereof so as to turn about the upper middle axis M1 that is parallel or substantially parallel to the upper right axis M3 and the upper left axis M2 via the upper middle bearing 511.

The lower cross portion 52 extends in the left-and-right direction of the vehicle body frame 21 when seen from the front of the vehicle. A length in the left-and-right direction of the lower cross portion 52 is equal or substantially equal to a length in the left-and-right direction of the upper cross portion 51. The lower cross portion 52 is provided below the upper cross portion 51. The lower cross portion 52 preferably has a rigidity that is larger than that of the upper cross portion 51. The rigidity of these cross portions will be described in detail below.

The lower cross portion 52 includes a front lower cross portion 52a1 and a rear lower cross portion 52a2 that hold the headstock 211 therebetween in the front-and-rear direction of the vehicle body frame 21 and a connecting portion 52b where the front lower cross portion 52a1 and the rear lower cross portion 52a2 are connected together with bolts, for example. The connecting portion 52b is preferably integral with the front lower cross portion 52a1. The connecting portion 52b is located at a position where the connecting portion 52b does not interfere with the headstock 211, the left side portion 53, and the right side portion 54 even though the link mechanism 5 is actuated to operate as will be described below. In the present preferred embodiment, the front lower cross portion 52a1 and the rear lower cross portion 52a2 have a thickness in the front-and-rear direction of the vehicle body frame 21 that are equal or substantially equal to a thickness in the front-and-rear direction of the vehicle body frame 21 of the upper cross portion 51. Additionally, the upper cross portion 51, the front lower cross portion 52a1, and the rear lower cross portion 52a2 are preferably made of the same or similar steel, for example.

A lower middle bearing 521 at a middle portion in the left-and-right direction of the vehicle body frame 21, and a lower left bearing 522 and a lower right bearing 522 at or near leftmost and rightmost portions in the left-and-right direction of the vehicle body frame 21 are provided in each of front lower cross portion 52a1 and rear lower cross portion 52a2 of the lower cross portion 52. These lower middle bearings 521, as well as the lower left bearings 522 and the lower right bearings 522, are provided so that a lower middle axis M4, a lower left axis M5, and a lower right axis M6 that are respective turning centers of the bearings are parallel or substantially parallel to one another. Additionally, the lower middle axis M4, the lower left axis M5, and the lower right axis M6 are also parallel or substantially parallel to the upper middle axis M1, the upper left axis M2, and the upper right axis M3. In addition, in relation to their positions in the left-and-right direction of the vehicle body frame 21, the lower left bearing 522 and the lower right bearing 522 are located at equal or substantially equal positions as the upper left bearing 512 and the upper right bearing 512, respectively, in relation to the left-and-right direction of the vehicle body frame 21 with the vehicle 10 resting in the upright state.

The lower cross portion 52 is mounted on the headstock 211 via the lower middle bearings 521 in a position located below the upper cross portion 51 in relation to the up-and-down direction of the vehicle body frame 21. This allows the lower cross portion 52 to be supported on the headstock 211 so as to turn about the lower middle axis M4.

The lower cross portion 52 is connected to a lower portion of the left side portion 53 and a lower portion of the right side portion 54 via the lower left bearings 522 and the lower right bearings 522, respectively. This allows the lower cross portion 52 to turn about the lower left axis M5 and the lower right axis M6 relative to the left side portion 53 and the right side portion 54, respectively.

In the present preferred embodiment, the lower cross portion 52 preferably includes a combination of two portions. That is, the lower cross portion 52 preferably includes the portion 52a2 that supports the lower portion of the right side portion 54 at the right end portion thereof via the lower right bearing 522 so as to turn about the lower right axis M6 that is parallel or substantially parallel to the upper right axis M3, that supports the lower portion of the left side portion 53 at the left end portion thereof via the lower left bearing 522 so as to turn about the lower left axis M5 that is parallel or substantially parallel to the upper left axis M2, and that is supported on the vehicle body frame 21 at the middle portion thereof via the lower middle bearing 521 so as to turn about the lower middle axis that is parallel or substantially parallel to the upper middle axis and located rearward of the headstock 211; and the portion (the portions denoted by reference numeral 52a1 and reference numeral 52b) that supports the lower portion of the right side portion 54 at the right end portion thereof via the lower right bearing 522 so as to turn about the lower right axis M6 that is parallel or substantially parallel to the upper right axis M3, supports the lower portion of the left side portion 53 at the left end portion thereof via the lower left bearing 522 so as to turn about the lower left axis M5 that is parallel or substantially parallel to the upper left axis M2, and that is supported on the vehicle body frame 21 at the middle portion thereof via the lower middle bearing 521 so as to turn about the lower middle axis that is parallel or substantially parallel to the upper middle axis.

In this manner, the upper cross portion 51 is supported on the headstock 211 so as to turn about the upper middle axis M1 that is located above the left front wheel 31 and the right front wheel 32 in relation to the up-and-down direction of the vehicle body frame 21. The lower cross portion 52 is supported on the headstock 211 so as to turn about the lower middle axis M4 that is located above the left front wheel 31 and the right front wheel 32 and located below the upper middle axis M1 in relation to the up-and-down direction of the vehicle body frame 21. In the present preferred embodiment, with the vehicle resting in the upright state, the upper cross portion 51 and the lower cross portion 52 are disposed entirely above the left front wheel 31 and the right front wheel 32 in relation to the up-and-down direction of the vehicle body frame 21.

Thus, by being configured in the manner described above, the link mechanism 50 operates within a plane that contains the left side portion 53 and the right side portion 54. It is noted that the link mechanism 50 is mounted on the headstock 211. Because of this, even though the steering shaft 60 turns in association with the turn of the handlebar 23, the link mechanism 50 is not turned relative to the vehicle body frame 21.

Figure 4:
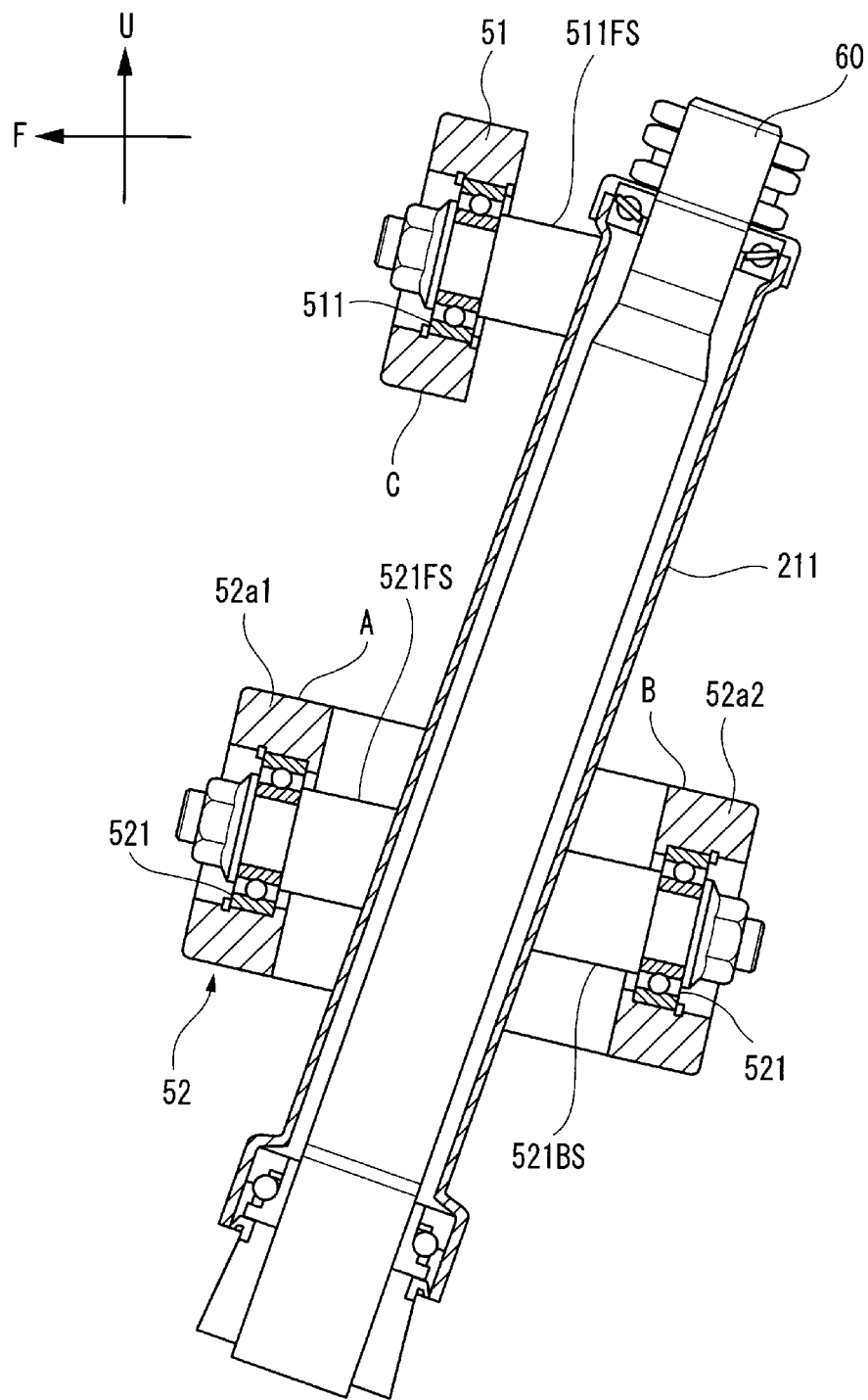
FIG. 4 is a side sectional view of the link mechanism.

FIG. 4 is a sectional view showing an upper portion of the link mechanism 50 as seen from a side of the vehicle with the vehicle resting in the upright state. As shown therein, in the present preferred embodiment, a lower surface C of the upper cross portion 51 is situated between an upper surface A of the front lower cross pat 52a1 that defines a front portion of the lower cross portion 52 and an upper surface B of the rear lower cross portion 52a2 that defines a rear portion of the lower cross portion 52 in relation to the front-and-rear direction of the vehicle body frame 21. An upper front middle supporting portion 511FS is provided on the headstock 211 and this upper front middle supporting portion 511FS supports the upper cross portion 51 so as to turn about the upper middle axis M1 via the upper middle bearing 511. A lower front middle supporting portion 521FS and a lower front middle supporting portion 521BS are provided on the headstock 211, and the lower front middle supporting portion 521FS and the lower front middle supporting portion 521BS support the lower cross portion 52 so as to turn about the lower middle axis M4 via the lower middle bearings 521.

With the vehicle resting in the upright state as shown in FIG. 4, the positional relationship just described above will be maintained even though the link mechanism 5 is actuated to operate as the vehicle body leans as will be described below. To be specific, even though the link mechanism 5 is actuated to operate, the lower surface C of the upper cross portion 51 is still situated between the upper surface A of the front lower cross portion 52a1 that defines the front portion of the lower cross portion 52 and the upper surface B of the rear lower cross portion 52a2 that defines the rear portion of the lower cross portion 52 in relation to the front-and-rear direction of the vehicle frame body 21.

In other words, the link mechanism 5 is configured so that a front end of the upper cross portion 51 and a front end of the lower cross portion 52 are situated in different positions in the direction of the upper right axis M3.

As shown in FIG. 2, the first bracket 335 is provided at a lower portion of the left side portion 53. The first bracket 335 is connected to the left shock absorber 33. The first bracket 335 is mounted so as to turn relative to the left side portion 53. The tie-rod 6 is also mounted on the first bracket 335 so as to turn relative thereto. A turning axis around which the first bracket 335 and the left side portion 53 turn relative to each other and a turning axis around which the first bracket 335 and the tie-rod 6 turn relative to each other are parallel or substantially parallel to a direction in which the left side portion 53 extends (the left steering axis N1).

The second bracket 336 is provided at a lower portion of the right side portion 54. The second bracket 336 is connected to the right shock absorber 34. The second bracket 336 is mounted so as to turn relative to the right side portion 54. The tie-rod 6 is also mounted on the second bracket 336 so as to turn relative thereto. A turning axis around which the second bracket 336 and the right side portion 54 turn relative to each other and a turning axis on which the second bracket 336 and the tie-rod 6 turn relative to each other are parallel or substantially parallel to a direction in which the right side portion 54 extends (the right steering axis N2).

The steering shaft 60 is supported on the vehicle body frame 21 between the left side portion 53 and the right side portion 54 in the left-and-right direction of the vehicle body frame 21. An upper end portion of the steering shaft 60 is provided above the lower middle axis M4 in the up-and-down direction of the vehicle body frame 21. The steering shaft 60 turns about a middle steering axis Z that extends in the up-and-down direction of the vehicle body frame 21. The handlebar 23 is provided at the upper end portion of the steering shaft 60. The tie-rod 6 (an example of a turning transmission mechanism) transfers a turning motion of the steering shaft 60 that corresponds to an operation of the handlebar 23 to the right shock absorber 34 and the left shock absorber 33.

When the steering shaft 60 turns as the handlebar 23 turns, the tie-rod 6 moves in the left-and-right direction of the vehicle body frame 21. Then, the first bracket 335 turns about the turning axis on which the first bracket 335 turns relative to the left side portion 53 as the tie-rod 6 moves. This moves a connecting portion 52b where the first bracket 335 connects to the left shock absorber 33 in the left-and-right direction of the vehicle body frame 21, and the left front wheel 31 turns about the second turning axis 312.

In this manner, the first bracket 335 transfers the turning motion of the handlebar 23 to the left front wheel 31. Similarly, the second bracket 336 transfers the turning motion of the handlebar 23 to the right front wheel 32.

FIG. 5 is an overall front view of the vehicle 1 of which the vehicle body is caused to lean at an angle T to the left in relation to a perpendicular direction from the state shown in FIG. 2. When the vehicle 1 is caused to lean in relation to the perpendicular direction, the link mechanism 5 is actuated to operate.

As this occurs, the upper cross portion 51 and the lower cross portion 52 are translated horizontally in the left-and-right direction while the direction in which they extend is kept parallel or substantially parallel to the road surface G. The upper cross portion 51 and the lower cross portion 52 turn about the upper left axis M2 and the lower left axis M5, respectively, relative to the left side portion 53. Additionally, the upper cross portion 51 and the lower cross portion 52 also turn about the upper right axis M3 and the lower right axis M6, respectively, relative to the right side portion 54.

In this manner, when the vehicle is seen from the front, with the vehicle resting in the upright state, the upper cross portion 51, the lower cross portion 52, the left side portion 53, the right side portion 54 define a rectangle, and when the vehicle is caused to lean, the link mechanism 5 operates so that the rectangle changes to a parallelogram as the vehicle leans farther.

In the following description, an area where the upper cross portion 51, the lower cross portion 52, the left side portion 53, and the right side portion 54 move when the link mechanism 5 is actuated to operate is preferably referred to as a movable range of the link mechanism 5.

In the present preferred embodiment, the link mechanism 50 operates so that a left end of the upper cross portion 51 moves farther horizontally leftwards than a left end of the lower cross portion 52. When the link mechanism 50 operates in this manner, the left shock absorber 33 and the right shock absorber 34 lean in relation to the perpendicular direction. When the vehicle 1 leans to the left in relation to the perpendicular direction in the manner described above, the state of the vehicle 1 changes from the state shown in FIG. 2 to the state shown in FIG. 5.

The vehicle 1 according to the present preferred embodiment is turned by causing the vehicle body to lean in the left-and-right direction while the vehicle 1 is running. Additionally, the directions of the left front wheel 31 and the right front wheel 32 are also changed by operating the handlebar 23.

Next, the rigidity of the upper cross portion 51 and the lower cross portion 52 will be described. In the following description, the rigidity of the upper cross portion 51 and the lower cross portion 52 (hereinafter, when both the cross portions are not discriminated from each other, the upper cross section 51 and the lower cross section 52 will be referred to simply as a cross portion) refer to the difficulty in deflection that the cross portions have when a force is exerted on the cross portions.

The left front wheel 31 and the right front wheel 32 of the vehicle 1 are supported independently of each other. Because of this, there are situations in which forces that are different in magnitude are exerted on the left front wheel 31 and the right front wheel 32 at different timings. For example, when the brakes are applied or the vehicle 1 rides over irregularities or undulations on the road surface, an external force is transferred to the link mechanism 5. As this occurs, there are situations in which forces that are different in magnitude or direction are exerted on the upper cross portion or the lower cross portion. Additionally, there are situations in which forces are exerted on the upper cross portion of the lower cross portion at different timings. Further, as those occur, there are situations in which the upper cross portion or the lower cross portion is twisted. To deal with these situations, the right side portion 54, the left side portion 53, the upper cross portion 51, and the lower cross section 52 of the vehicle 1 of the present preferred embodiment each have high rigidity that maintains the smooth operation of the link mechanism 5.

The right side portion 54, the left side portion 53, the upper cross portion 51, and the lower cross portion 52 of the link mechanism 5 are each made of a highly rigid material to enhance the function of turning smoothly and the function of transferring loads. This eventually enlarges external shapes of the right side portion 54, the left side portion 53, the upper cross portion 51, and the lower cross portion 52. Additionally, this results in enlargement of the link mechanism 5 including those portions that are enlarged. Further, the movable range of the link mechanism 5 is also expanded further. The vehicle that includes the vehicle body frame 21 that can lean and two front wheels 31, 32 includes on the periphery of the steering shaft 60 a large link mechanism 5 that moves as the vehicle body frame 21 leans. Because of this, in the vehicle including the vehicle body frame 21 that can lean and two front wheels 31, 32, on-board components need to be arranged so that the on-board components do not interfere with the movable range of the link mechanism 5. This requires enhancing the degree of freedom in designing the link mechanism 5 in the vehicle 1 that includes the vehicle body frame 21 that can lean and two front wheels 31, 32.

Firstly, the inventor of the preferred embodiments of the present invention analyzed in detail the function of the link mechanism 5. The link mechanism 5 includes the function of enabling the right side portion 54 or the left side portion 53 to turn smoothly relative to the upper cross portion 51 and the lower cross portion 52 and the function of enabling the upper cross portion 51 and the lower cross portion 52 to turn smoothly relative to the vehicle body frame 21. Additionally, the link mechanism 5 includes the function of transferring loads received by the right side portion 54 or the left side portion 53 to the vehicle body frame 21.

The inventor has discovered that the upper cross portion 51 and the lower cross portion 52 are twisted by the loads received by the link mechanism 5. The inventor discovered that the twisting of the upper cross portion 51 occurs along an upper center axis 51C (refer to FIGS. 6A and 6B) that passes through a center of the upper right bearing 512 of the upper cross member 51 in relation to the direction of the upper right axis M3 and a center of the upper left bearing 512 of the upper cross member 51 in relation to the direction of the upper left axis M2. The inventor also has discovered that the twisting of the lower cross portion 52 occurs along a lower center axis 52C (refer to FIGS. 7A and 7B) that passes through a center between the upper right bearings 522 of the lower cross member 52 in relation to the direction of the lower right axis M6 and a center between the lower left bearings 522 of the lower cross member 52 in relation to the direction of the lower left axis M5.

Various cross portions that are different in torsional rigidity about the upper center axis 51C and in torsional rigidity about the lower center axis 52C have also been studied. The results of the inventor's studies discovered that even though the torsional rigidity of the upper cross portion 51 that includes the portions that are supported on the side portions at the right end portion and the left end portion thereof and that is supported on the vehicle body frame at the middle portion thereof is different from the torsional rigidity of the lower cross portion 52 that includes the portions that are supported on the side portions at the right end portion and the left end portion thereof and that is supported on the vehicle body frame at the middle portion thereof, when the torsional rigidity of the lower cross portion 52 is higher than the torsional rigidity of the upper cross portion 51, smooth operation of the link mechanism is easily maintained. It is considered that this is attributed to the fact that a difference between a distance between an axle of the right front wheel 32 and the upper right bearing 512 that is located between the upper cross portion 51 and the right side portion 54 and a distance between the axle of the right front wheel 32 and the lower right bearings 522 that are located between the lower cross portion 52 and the right side portion 54 is different from a distance between an axle of the left front wheel 31 and the upper left bearing 512 that is located between the upper cross portion 51 and the left side portion 53 and a distance between the axle of the left front wheel 31 and the lower left bearings 522 that are located between the lower cross portion 52 and the left side portion 53. The distance between the axle of the right front wheel 32 and the lower right bearings 521 that are located between the lower cross portion 51 and the right side portion 54 is shorter than the distance between the axle of the right front wheel 32 and the upper right bearing 512 that is located between the upper cross portion 51 and the right side portion 54. The distance between the axle of the left front wheel 31 and the lower left bearings 522 that are located between the lower cross portion 52 and the left side portion 53 is shorter than the distance between the axle of the left front wheel 31 and the upper left bearing 512 that is located between the upper cross portion 51 and the left side portion 53. It is considered that these factors affect the smooth operation of the link mechanism 5.

According to the vehicle of the present preferred embodiment, the torsional rigidity of the lower cross portion 52 is higher than the torsional rigidity of the upper cross portion 51. Therefore, the smooth operation of the link mechanism 5 is easily maintained. Moreover, the upper cross portion 51 and the lower cross portion 52 each include a portion that is supported on the side portions 53, 54 at the right end portion and the left end portion thereof and that is supported on the headstock 211 at the middle portion thereof, and the torsional rigidity of the upper cross portion 51 is different from the torsional rigidity of the lower cross portion 52. Therefore, it is possible to enhance the degree of freedom in designing the link mechanism 5.

The rigidity of the cross portions of the link mechanism 5 includes a rigidity component attributed to the shape, thickness, material and the like of the cross portion itself and a rigidity component attributed to the type, size and the like of the upper middle bearing 511 or the lower middle bearings 521. Then, it is possible to know the rigidity of the cross portions based on displacements of the cross portions that are measured as will be described below. It is shown that the smaller a displacement, the larger the rigidity.

Figure 6A:
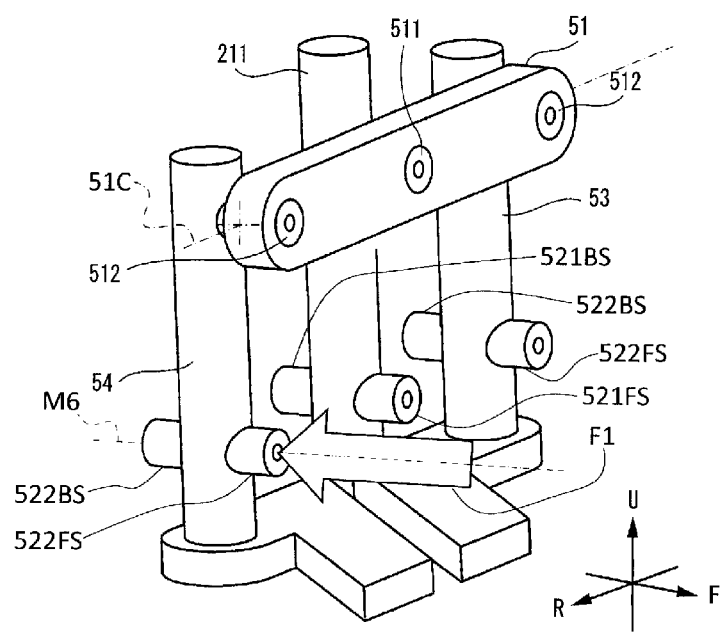
FIGS. 6A and 6B show schematic drawings showing how to measure rigidity with a lower cross portion removed.
Figure 6B:
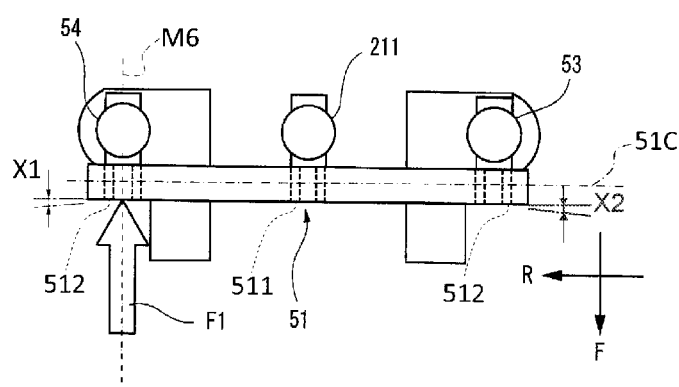
Figure 7A:
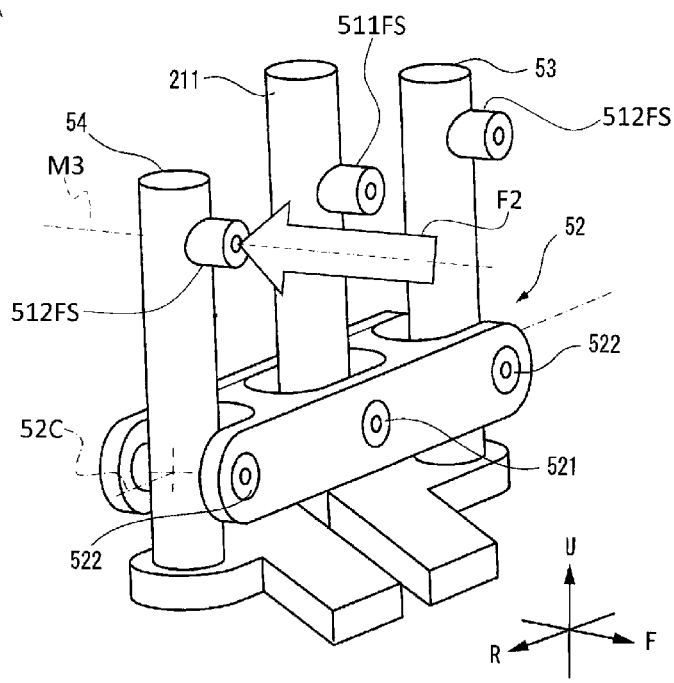
FIGS. 7A and 7B show schematic drawings showing how to measure rigidity with an upper cross portion removed.
Figure 7B:
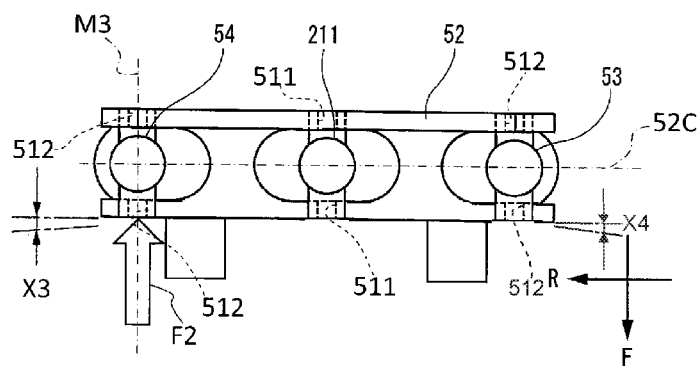

FIGS. 6A and 6B are schematic drawings showing how to measure rigidity of the upper cross portion 51 with the lower cross portion 52 removed. FIG. 6A is a perspective view of an upper portion of the link mechanism 5, and FIG. 6B is a plan view of the upper portion of the link mechanism 5. FIGS. 7A and 7B are schematic drawings showing how to measure rigidity of the lower cross portion 52 with the upper cross portion removed. FIG. 7A is a perspective view of the upper portion of the link mechanism 5, and FIG. 7B is a plan view of the upper portion of the link mechanism 5.

As shown in FIG. 6A, the lower cross portion 52 is removed from the headstock 211. In this state, the upper middle bearing 511, the upper left bearing 512, and the upper right bearing 512 are kept mounted in the upper cross portion 51.

An upper right displacement X1 of the upper cross portion 51 is measured which results when a rearward test force F1 in the direction of the lower right axis M6 is exerted on the lower front right supporting portion 522FS when the lower cross portion 52 is removed while the upper cross portion 51 is kept mounted. In an equivalent or similar state, an upper left displacement X2 of the upper cross portion 51 is measured which results when a force that is equal or substantially equal in magnitude and direction (a rearward direction in the direction of the lower left axis M5) as the test force F1 is exerted on the upper left supporting portion 522FS.

When the rearward test force F1 in the direction of the lower right axis M6 is exerted on the lower front right supporting portion 522FS, as has been described above, the upper cross portion 51 is twisted about the upper center axis 51C. Then, as shown in FIG. 6B, as seen from the top thereof in the up-and-down direction of the vehicle body frame 21, a front edge of an upper surface of the upper cross portion 51 moves to the front in the front-and-rear direction of the vehicle body frame 21. This forward movement of the front edge of the upper surface at the right end portion of the upper cross portion 51 in the front-and-rear direction of the vehicle body frame 21 is measured as the upper right displacement X1.

Similarly, when the rearward force in the direction of the lower left axis M5 that is equal or substantially equal in magnitude as the test force F1 is exerted on the lower front left supporting portion 522FS, the upper cross portion 51 is twisted about the upper center axis 51C. Then, as seen from the top thereof in the up-and-down direction of the vehicle body frame 21, the front edge of the upper surface of the upper cross portion 51 moves to the front in the front-and-rear direction of the vehicle body frame 21. This forward movement of the front edge of the upper surface at the left end portion of the upper cross portion 51 in the front-and-rear direction of the vehicle body frame 21 is measured as an upper left displacement X2.

Next, as shown in FIGS. 7A and 7B, the upper cross portion 51 is removed from the headstock 211. The lower middle bearings 521, the lower left bearings 522, and the lower right bearings 522 are kept mounted in the lower cross portion 52. A lower right displacement X3 of the lower cross portion 52 is measured which results when a force that is equal or substantially equal in magnitude and direction (rearward in the direction of the upper right axis M3) as the test force F1 is exerted on the upper front right supporting portion 512FS when the upper cross portion 51 is removed while the lower cross portion 52 is kept mounted. In an equivalent or similar state, a lower left displacement X4 of the lower cross portion 52 is measured which results when a force that is equal or substantially equal in magnitude and direction (rearward in the direction of the upper left axis M2) as the test force F1 is exerted on the upper left supporting portion 512FS.

When the force that is equal or substantially equal in magnitude and direction as the test force F1 is exerted on the upper front right supporting portion 512FS, as has been described above, the lower cross portion 52 is twisted about the lower center axis 52C. Then, as shown in FIG. 7B, as seen from the top thereof in the up-and-down direction of the vehicle body frame 21, a front edge of a lower surface of the lower cross portion 52 moves to the front in the front-and-rear direction of the vehicle body frame 21. This forward movement of the front edge of the lower surface at the right end portion of the lower cross portion 52 in the front-and-rear direction of the vehicle body frame 21 is measured as the lower right displacement X3.

Similarly, when the force that is equal or substantially equal in magnitude and direction as the test force F1 is exerted on the upper front left supporting portion 512FS, the lower cross portion 52 is twisted about the lower center axis 52C. Then, as seen from the top thereof in the up-and-down direction of the vehicle body frame 21, the front edge of the lower surface of the lower cross portion 52 moves to the front in the front-and-rear direction of the vehicle body frame 21. This forward movement of the front edge of the lower surface at the left end portion of the lower cross portion 52 in the front-and-rear direction of the vehicle body frame 21 is measured as a lower left displacement X4.

The test force is exerted only on either the left end portion or the right end portion of the upper cross portion 51 and the lower cross portion 52, in particular, either of the lower front right supporting portion 522FS and the lower front left supporting portion 522FS or either of the upper front right supporting portion 512FS and the upper front left supporting portion 512FS. By doing so, a force that is exerted on the upper cross portion 51 and the lower cross portion 52 when the brakes are applied or the vehicle rides over irregularities or undulations on the road surface is simulated.

When the upper right displacement X1, the upper left displacement X2, the lower right displacement X3, and the lower left displacement X4 are measured in the manner described above, in the vehicle 1 of the present preferred embodiment, the upper right displacement X1 and the upper left displacement X2 of the upper cross portion 51 are equal or substantially equal to each other, and the lower right displacement X3 and the lower left displacement X4 of the lower cross portion 52 are equal or substantially equal to each other. The upper right displacement X1 of the upper cross portion 51 is larger than the lower right displacement X3 of the lower cross portion 52. The upper left displacement X2 of the upper cross portion 51 is larger than the lower left displacement X4 of the lower cross portion 52. Additionally, a shape of the upper cross portion 51 is smaller than a shape of the lower cross portion 52. Additionally, a volume of the upper cross portion 51 is smaller than a volume of the lower cross portion 52.

In the vehicle 1 of the present preferred embodiment, a thickness in a front-and-rear direction and a thickness in an up-and-down direction of the upper cross portion 51 are equal or substantially equal to corresponding thicknesses of the front lower cross portion 52a1 and the rear lower cross portion 52a2 of the lower cross portion 52, and an equal or substantially equal bearing is used for the upper middle bearing 511 and the lower middle bearings 521.

Additionally, the upper cross portion 51 preferably does not have a member that corresponds to the connecting portion 52b of the lower cross portion 52. Further, the upper middle bearing 511 is preferably disposed only forward of the headstock 211. In contrast with this, the lower middle bearings 521 are provided both at a front and rear side of the headstock 211. Since the lower cross portion 52 is supported by the lower middle bearings 521 at two locations in the front-and-rear direction, the displacements X1, X2 is preferably larger than twice the displacements X3, X4, respectively.

In addition, by using any one of the following configurations (1) to (3), the displacements X1, X2 of the upper cross portion 51 become larger than the displacements X3, X4 of the lower cross portion 52. (1) The upper cross portion 51 is larger than the front lower cross portion 52a1 that defines the front portion of the lower cross portion. (2) The upper middle bearing 511 of the upper cross portion 51 is larger than the lower middle bearings 521 of the lower cross portion 52. (3) The upper middle bearing 511 of the upper cross portion 51 includes a plurality of bearings.

In the description above, the rearward test force F1 is preferably exerted on the lower front right supporting portion 522FS, the lower front left supporting portion 522FS, the upper front right supporting portion 512FS, and the upper front left supporting portion 512FS. However, a forward test force F1 is may be exerted on the lower front right supporting portion 522FS, the lower front left supporting portion 522FS, the upper front right supporting portion 512FS, and the upper front left supporting portion 512FS. When the test forces that act in opposite directions in relation to the front-and-rear direction are exerted on the upper cross portion 51 and the lower cross portion 52, the above longitudinal loads that are exerted on the cross portions when the brakes are applied or the vehicle rides over the irregularities on the road surface is simulated.

According to the vehicle of the present preferred embodiment, the movable range of the link mechanism 5 is changed from a simple shape like a rectangular parallelepiped to an irregular shape by making the shape of the upper cross portion 51 that includes the portions that support the right side portion 54 and the left side portion 53 and that is supported on the vehicle body frame 21 differ from the shape of the lower cross portion 52 that includes the portions that support the right side portion 54 and the left side portion 53 and that is supported on the vehicle body frame 21. This enhances the degree of freedom in designing the periphery of the steering shaft 60. As a result of this, even though various on-board components that differ in size and the link mechanism 5 are disposed on the periphery of the steering shaft 60, it is possible to prevent enlargement of the periphery of the steering shaft 60. Moreover, although the ratio of assigned loads allocated between the portions of the upper cross portion 51 and the portions of the lower cross portion 52 is changed by making the shape of the upper cross portion 51 differ from the shape of the lower cross portion 52, it is easy to maintain the smooth operation of the link mechanism 5.

Consequently, in the vehicle that includes the vehicle body frame 21 that can lean and two front wheels 31, 32, it is possible to prevent enlargement in size of the construction around the periphery of the steering shaft 60 that is located above the two front wheels 31, 32 while maintaining the function of the link mechanism 5.

Specifically, the upper cross portion 51 preferably includes a single plate-shaped member, and as shown in FIG. 4, no member of the link mechanism 5 is provided at a rear upper portion of the link mechanism 5. This enables an upper portion of the space where the link mechanism 5 operates (the movable range of the link mechanism) to be smaller than the movable range of the link mechanism of Japanese Patent Unexamined Publication JP-A-2005-313876. Then, the vehicle body frame or accessories are disposed in the space in the rear upper portion of the link mechanism 5. Alternatively, the front cover 221 may be designed to be simply smaller in size by an area corresponding to the rear upper space to enhance the external design thereof. Here, the accessories include a hydraulic unit of an ABS (Antilock Braking System), headlamp, horn, turn signals, radiator, battery, anti-theft device, brake hose, brake wire, fasteners for brake hose and brake wire, body cover, various meters, and the like.

Therefore, a member of the vehicle body frame is designed to be large or an additional member is disposed in the space at the rear upper portion of the link mechanism 5 in the space at the front portion of the vehicle, such that it is possible to enhance the rigidity of the vehicle.

Alternatively, the rear upper space is used as a space where indicators such as a speedometer, and accessories such as lamps and a main switch are disposed or storage space. By doing so, positions where to dispose equipment at the front portion of the vehicle are freely designed. Additionally, it is also possible to improve the external design.

Further, to express the configuration described above in a different manner, the lower cross portion 52 includes the front lower cross portion 52a1 and the rear lower cross portion 52a2 disposed to hold the headstock 211 therebetween, and the upper cross portion 51 includes a single plate-shaped member. The shape of the lower cross portion 52 is larger than the shape of the upper cross portion 51. In particular, the lower cross portion 52 is made larger by using the space around the periphery of the lower portion of the link mechanism 5, and the rigidity of the lower cross portion 52 is larger than the rigidity of the upper cross portion 51.

In this manner, the rigidity of the link mechanism 5 is unbalanced between the upper portion and the lower portion of the link mechanism 5. Since the lower cross portion 52 bears most of the rigidity that is required of the link mechanism 5, compared with a design concept of equally sharing the rigidity required of the link mechanism 5 between the upper portion and the lower portion of the link mechanism 5, the upper cross portion 51 is smaller in shape than the lower cross portion 52 by making the upper cross portion 51 from a single plate-shaped portion. This allows the upper portion of the link mechanism 5 to be small, and therefore, the space defined around the periphery of the upper portion of the link mechanism 5 is easily used as the space where the vehicle body frame and the accessories are disposed. Alternatively, the space is easily used to enhance the external design of the vehicle.

In particular, the indicators and the vehicle body frame are disposed compactly behind the headstock 211 in many cases. In this respect, the present preferred embodiment where no member of the upper cross portion 51 is provided rearward of the headstock 211 is preferable since the space is effectively used for other applications. For example, the front frame 212 is connected directly to the headstock 211 without interposing a support member or the like therebetween, thus making it possible to enhance the rigidity of the front frame 212 and the headstock 211.

Additionally, the upper cross portion 51, the lower cross portion 52, the left side portion 53, and the right side portion 54 of the link mechanism 5 are turnably supported by the bearings. This enhances the rigidity of the link mechanism 5.

In a vehicle according to a preferred embodiment of the present invention, the upper right displacement X1 of the upper cross portion 51 is larger than the lower right displacement X3 of the lower cross portion 52, and the upper left displacement X2 of the upper cross portion 51 is larger than the lower left displacement X4 of the lower cross portion 52. Additionally, the shape of the upper cross portion 51 is smaller than the shape of the lower cross portion 52.

According to the vehicle of the present preferred embodiment, the shape of the upper cross portion 51 that includes the portions that support the right side portion 54 and the left side portion 53 and that is supported on the vehicle body frame 21 is easily made smaller than the shape of the lower cross portion 52 that includes the portions that support the right side portion 54 and the left side portion 53 and that is supported on the vehicle body frame 21. In other words, easily changing the shape the link mechanism enhances the degree of freedom in designing the link mechanism. Additionally, this enables the movable range of the link mechanism 5 to be changed from the simple shape like a rectangular parallelepiped to a shape in which an upper portion is small. This enhances the degree of freedom in designing an upper peripheral portion of the steering shaft 60. Since the ratio of the assigned load allocated to the upper cross portion 51 having a small shape is reduced, while the ratio of the assigned load allocated to the lower cross portion 52 having large shape is increased, the balance between rigidity and shape is easily controlled. This enhances the degree of freedom in designing the upper peripheral portion of the steering shaft 60. As a result of this, even though various on-board components having different sizes and the link mechanism 5 are disposed on the periphery of the steering shaft 60, it is possible to prevent enlargement in size of the periphery of the steering shaft 60. Consequently, in the vehicle that includes the vehicle body frame that can lean and two front wheels, it is possible to enhance the degree of freedom in designing the link mechanism while maintaining the function of the link mechanism. Additionally, in the vehicle that includes the vehicle body frame 21 that can lean and two front wheels 31, 32, it is possible to prevent further enlargement in size of the peripheral construction of the steering shaft 60 that is located above the two front wheels 31, 32 while maintaining the function of the link mechanism 5.

When referred to herein, the shape of the upper cross portion 51 indicates a shape that is defined by the outer shape of the upper cross portion 51, and the shape of the lower cross portion 52 indicates a shape that is defined by the outer shape of the lower cross portion 52. The outer shape of the upper cross portion 51 indicates an outer edge of an area defined by a surface of the upper cross portion 51 that makes up a movable range of the upper cross portion 51 when the link mechanism 5 operates. The outer shape of the lower cross portion 52 indicates an outer edge of an area defined by a surface of the lower cross portion 52 that makes up a movable range of the lower cross portion 52 when the link mechanism 5 operates.

For example, surfaces that define outlines of the left and right end portions of the upper cross portion 51 when seen in the direction of the upper middle axis M1 make up the left and right surfaces of the movable range of the upper cross portion 51. Because of this, the surfaces that define the outlines of the left and right end portions of the upper cross portion 51 when seen in the direction of the upper middle axis M1 affect the shape of the upper cross portion 51. Contrary to this, wall portions that define through holes that are provided in the upper cross portion 51 to mount the upper middle bearing 511, the upper right bearing 512, and the upper left bearing 512 are not surfaces that make up the movable range of the upper cross portion. Thus, the wall portions that define the through holes do not affect the shape of the upper cross portion 51. In addition to these wall portions, surfaces of recessed portions that are provided simply to reduce the weight of the upper cross portion 51 and that do not affect the movable range of the upper cross portion 51 do not affect the shape of the upper cross portion 51.

Thus, while the present invention has been described heretofore with reference to the preferred embodiments thereof, the technical scope of the present invention is not limited by the scope that is descriptively defined in the preferred embodiments above. It should be clear to those skilled in the art to which the present invention pertains that various alterations or improvements may be made to the preferred embodiments.

For example, the shape of the upper cross portion 51 may be different from the shape of the lower cross portion 52 as long as the displacement X1 is equal or substantially equal to the displacement X2, the displacement X3 is equal or substantially equal to the displacement X4, the displacement X1 is larger than the displacement X3, and the displacement X2 is larger than the displacement X4. Therefore, the volume of the upper cross portion 51 may be equal to or different from the volume of the lower cross portion 52, provided that the displacement X1 is equal or substantially equal to the displacement X2, the displacement X3 is equal or substantially equal to the displacement X4, the displacement X1 is larger than the displacement X3, and the displacement X2 is larger than the displacement X4. Alternatively, the weight of the upper cross portion 51 may be equal to or different from the weight of the lower cross portion 52 as long as the displacement X1 is equal or substantially equal to the displacement X2, the displacement X3 is equal or substantially equal to the displacement X4, the displacement X1 is different from the displacement X3, the displacement X2 is different from the displacement X4, and the shape of the upper cross portion 51 is different from the shape of the lower cross portion 52. Alternatively, the material of the upper cross portion 51 may be equal to or different from the material of the lower cross portion 52 as long as the displacement X1 is equal or substantially equal to the displacement X2, the displacement X3 is equal or substantially equal to the displacement X4, the displacement X1 is different from the displacement X3, the displacement X2 is different from the displacement X4, and the shape of the upper cross portion 51 is different from the shape of the lower cross portion 52.

For example, in the preferred embodiments described above, there is described an example of equivalent or similar materials having different shapes so that the displacement X1 is larger than the displacement X3 and that the displacement X2 is larger than the displacement X4. However, the approach to making the displacement X1 larger than the displacement X3 and the displacement X2 larger than the displacement X4 is not limited to that described in the preferred embodiments above. For example, the lower cross portion 52 may be made of a material having a Young's modulus that is larger than that of the material of the upper cross portion 51. By this approach, too, it is easy to obtain the displacements X1, X2 of the upper cross portion 51 that are larger than the displacements X3, X4 of the lower cross portion 52. This enhances the degree of freedom in designing the periphery of the steering shaft 60.

In addition, in the preferred embodiments described above, plate members having equal shapes are described as the upper cross portion 51 includes one plate member, and the lower cross portion 52 includes two plate members. However, the approach to providing different shapes to the upper and lower cross portions is not limited thereto. For example, a configuration is may be used in which the upper cross portion 51 includes one plate member and the lower cross portion 52 includes one member having an I-shaped cross section (whose sectional area is equal or substantially equal as that of the plate member). By using this configuration, the displacements X1, X2 of the upper cross portion 51 are larger than the displacements X3, X4 of the lower cross portion 52.

In addition to this, as the approach to providing different shapes to the upper cross portion 51 and the lower cross portion 52, it is possible to provide different sectional areas or sectional shapes to the upper and lower cross portions or provide or not provide a reinforcement rib to enhance the rigidity thereof. By using this configuration, the displacement X1 is larger than the displacement X3, and the displacement X2 is larger than the displacement X4. It is noted that when referred to herein, the description that the shapes of the upper cross portion and the lower cross portion differ indicates that a difference in shape that does not affect largely the rigidity of the cross sections is not included in the difference in shapes referred to above. The materials, weights, or volumes of the upper cross portion and the lower cross portion may differ as long as the shape of the upper cross portion differs from the shape of the lower cross portion.

In a preferred embodiment of the present invention, the upper cross portion and the lower cross portion may be made of equivalent or similar material but having different shapes. By making one of the upper cross portion and the lower cross portion so as to have a larger shape than that of the other in order to ensure the rigidity of the one portion, it is easy to enhance the degree of freedom in designing the link mechanism.

In the vehicle according to a preferred embodiment, the shape of the upper cross portion may be equal to or different from the shape of the lower cross portion. The material of the upper cross portion may be equivalent to or different from the material of the lower cross portion. The volume of the upper cross portion may be equal to or different from the volume of the lower cross portion. Alternatively, in the upper and lower cross sections, the shapes may be equal while the materials and volumes are different, the materials may be equivalent or similar while the shapes and volumes are different, or the volumes may be equal while the shapes and materials are different. Thus, various combinations may be used. The upper cross portion and the lower cross portion should be different in at least one of shape, material, and volume so that the displacement X1 and the displacement X2 are equal or substantially equal, the displacement X3 and the displacement X4 are equal or substantially equal, the displacement X1 is larger than the displacement X3, and the displacement X2 is larger than the displacement X4. Accordingly, it is possible to enhance both the degree of freedom in designing the link mechanism and the degree of freedom in designing the peripheral space of the link mechanism. This prevents enlargement in size of the front portion of the vehicle. Additionally, this makes the front portion of the vehicle small in size.

For example, by using a material having a higher rigidity than that of the material used for the cross portion having the smaller displacement for the cross portion having the larger displacement, the shape of the cross portion having the larger displacement is smaller in size to enhance the degree of freedom in designing the peripheral space of the cross portion having the larger displacement. This prevents enlargement in the size of the front portion of the vehicle. Additionally, this makes the front portion of the vehicle small in size.

In the preferred embodiments described above, as an example in which the rigidity of the upper cross portion 51 is made to differ from that of the lower cross portion 52, the rigidity of the lower cross portion 52 is larger than the rigidity of the upper cross portion 51. Although the rear upper space of the link mechanism 5 is described as being used for other applications including the application in which accessories are disposed in the space by making the rigidity of the lower cross portion in that manner, the present invention is not limited thereto. For example, a configuration may be used in which a front upper space of the link mechanism 5 is used for other applications by providing a single upper cross portion 51 behind the headstock 211. This prevents enlargement in the size of the front portion of the vehicle. Additionally, this makes the front portion of the vehicle small in size.

In addition, a configuration may be used in which the link mechanism 5 is constructed upside down compared with the construction described in the preferred embodiments above. In other words, a configuration may be used in which an upper cross portion 51 includes two cross portions, that is, a front upper cross portion and a rear upper cross portion that are provided so as to hold the headstock 211 from the front and rear therebetween, while a single lower cross portion 52 is provided only either forward of or rearward of the headstock 211. Accordingly, either a front lower portion or a rear lower portion of the link mechanism 5 is used for other applications. This prevents enlargement in the size of the front portion of the vehicle. Additionally, this makes the front portion of the vehicle small in size.

Additionally, in the preferred embodiments described above, while the link mechanism 5 is described as including the upper cross portion 51 and the lower cross portion 52, the present invention is not limited thereto. For example, as the link mechanism, a link mechanism may be used which is configured to include three or more cross portions such as a link mechanism including an upper cross portion, a lower cross portion, and a middle cross portion that is provided between the upper cross portion and the lower cross portion.

In addition, in the preferred embodiments described above, while the upper cross portion 51 and the lower cross portion 52 are described as being mounted on the headstock 211 that turnably supports the steering shaft 60, the present invention is not limited thereto. For example, the upper cross portion 51 and the lower cross portion 52 may be mounted at a location that extends upwards and forwards from the front frame 212 or a member that is mounted on the front frame 212 so as to extend upwards and forwards.

Additionally, while the front lower cross portion 52a1 and the rear lower cross portion 52a2 that are provided at the front and rear of the lower cross portion 52 are described as being connected individually to the left side portion 53 and the right side portion 54 via the lower left bearings 522 and the lower right bearings 522, the present invention is not limited thereto. Only either of the front lower cross portion 52a1 and the rear lower cross portion 52a2 may be connected to the left side portion 53 and the right side portion 54. However, the front lower cross portion 52a1 and the rear lower cross portion 52a2 that are provided at the front and rear of the lower cross portion 52 may be connected individually to the left side portion 53 and the right side portion 54, thus making it easy to enhance the rigidity of the lower cross portion 52. By using this configuration, it is possible to enhance both the degree of freedom in designing the link mechanism and the degree of freedom in designing the peripheral space of the link mechanism. This prevents enlargement in the size of the front portion of the vehicle. Additionally, this makes the front portion of the vehicle small in size.

In the preferred embodiments described above, as shown in FIG. 4, the lower cross portion 52 preferably includes the front lower cross portion 52a1 and the rear lower cross portion 52a2 that are connected, respectively, to the front and rear of the headstock 211 in such a manner as to hold the headstock 211 therebetween in the front-and-rear direction of the vehicle body frame 21. Additionally, the upper cross portion 51 is provided only at the front of the headstock 211 in relation to the front-and-rear direction of the vehicle body frame 21. By using this configuration, it is possible to enhance both the degree of freedom in designing the link mechanism and the degree of freedom in designing the peripheral space of the link mechanism. This prevents enlargement in the size of the front portion of the vehicle. Additionally, this makes the front portion of the vehicle small in size. However, the present invention is not limited thereto.

Figure 8:
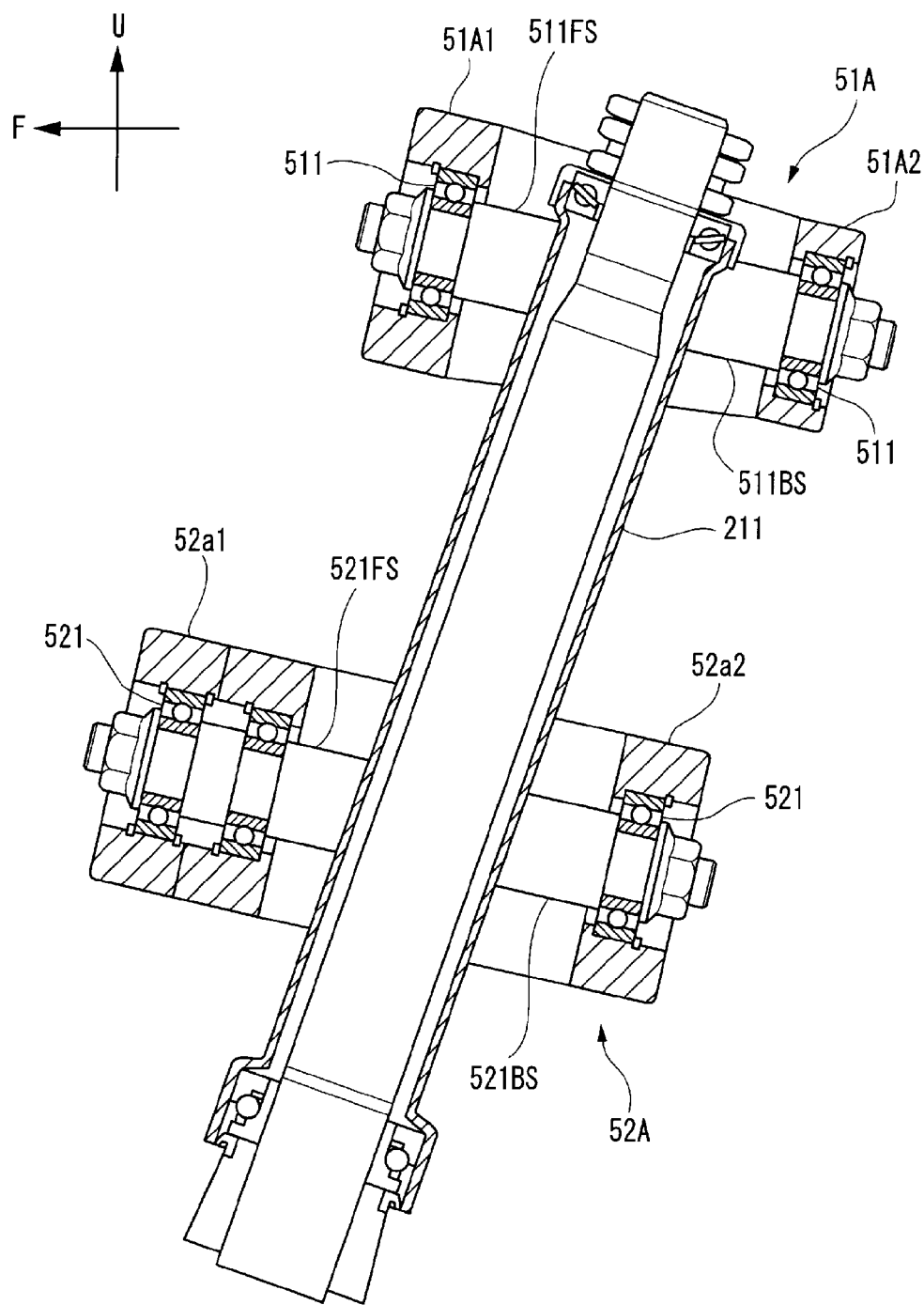
FIG. 8 is a view similar to FIG. 4 and shows a vehicle according to a modified preferred embodiment of the present invention.

For example, as shown in FIG. 8, a configuration may be used in which an upper cross portion 51A includes a front upper cross portion 51A1 and a rear upper cross portion 51A2 that are individually connected to a headstock 211 in such a manner as to hold the headstock 211 therebetween in a front-and-rear direction of a vehicle body frame 21.

An upper front middle supporting portion 511FS and an upper rear middle bearing 511BS are provided on the headstock 211 to support the upper cross portion 51 so as to turn about the upper middle axis M1 via upper middle bearings 511.

A lower front middle supporting portion 521FS and a lower front middle supporting portion 521BS are provided on the headstock 211, and the lower front middle supporting portion 521FS and the lower front middle supporting portion 521BS support the lower cross portion 52 so as to turn about the lower middle axis M4 via the lower middle bearings 521.

Although not shown, in the preferred embodiment shown in FIG. 8, an upper front right supporting portion 512FS is provided on a right side portion 54 to support the upper cross portion 51 so as to turn about an upper right axis M3 via an upper right bearing 512. A lower front right supporting portion 522FS is provided on the right side portion 54 to support the lower cross portion 51 so as to turn about a lower right axis M6 via a lower right bearing 522.

An upper front left supporting portion 512FS is provided on a left side portion 53 to support the upper cross portion 51 so as to turn about an upper left axis M2 via an upper left bearing 512. A lower front left supporting portion 522FS is provided on the left side portion 53 to support the lower cross portion 51 so as to turn about a lower left axis M5 via a lower left bearing 522.

An upper rear right supporting portion 512BS is provided on the right side portion 54 to support the upper cross portion 51 so as to turn about the upper right axis M3 via an upper right bearing 512. A lower rear right supporting portion 522BS is provided on the right side portion 54 to support the lower cross portion 51 so as to turn about the lower right axis M6 via a lower right bearing 522.

An upper rear left supporting portion 512BS is provided on the left side portion 53 to support the upper cross portion 51 so as to turn about the upper left axis M2 via an upper left bearing 512. A lower rear left supporting portion 522BS is provided on the left side portion 53 to support the lower cross portion 51 so as to turn about the lower left axis M5 via a lower left bearing 522.

Accordingly, the front upper cross portion 51A1 is larger than the rear upper cross portion 51A2. By using this configuration, compared with a case where the front upper cross portion 51A1 is substantially as large as the rear upper cross portion 51A2, it is possible to enhance the degree of freedom in designing the location where a front frame 212 is connected to the headstock 211. By using this configuration, it is possible to enhance both the degree of freedom in designing the link mechanism and the degree of freedom in designing the peripheral space of the link mechanism. This prevents enlargement in the size of the front portion of the vehicle. Additionally, this makes the front portion of the vehicle small in size. Also in the configuration shown in FIG. 8, an upper right displacement X1 and an upper left displacement X2 are equal or substantially equal to each other, a lower right displacement X3 and a lower left displacement X4 are equal or substantially equal to each other, the upper right displacement X1 is larger than the lower right displacement X3, and the upper left displacement X2 is larger than the lower left displacement X4.

In the preferred embodiment shown in FIG. 8, a shape of the upper cross portion 51A is smaller than a shape of the lower cross portion 52A.

In the vehicle shown in FIG. 8, the vehicle body frame 21 includes the headstock 211 that supports the upper cross portion 51A and the lower cross portion 52A so as to turn. A shape of the front upper cross portion 51A1 located forward of the headstock 211 and a shape of the rear upper cross portion 51A2 located rearward of the headstock 211 in relation to the direction of the upper right axis M3 are different from each other. Specifically, the shape of the front upper cross portion 51A1 is larger than that of the rear upper cross portion 51A2.

According to a vehicle in a preferred embodiment of the present invention that includes the vehicle body frame 21 that can lean and two front wheels 31, 32, the shape of the front portion of the upper cross portion 51 located forward of the link supporting portion is different from the shape of the rear portion of the upper cross portion 51 located rearward of the link supporting portion, and therefore, it is possible to enhance the degree of freedom in designing the link mechanism. Additionally, this enables the movable range of the link mechanism 5 to be changed from the simple shape like a rectangular parallelepiped to a shape in which an upper rear portion is smaller than other areas. This enhances the degree of freedom in designing the rear peripheral space of the upper cross portion 51. As a result of this, even though various on-board components having different sizes and the link mechanism 5 are disposed on the periphery of the steering shaft 60, it is possible to prevent further enlargement of the periphery of the steering shaft 60. By using this configuration, it is possible to enhance both the degree of freedom in designing the link mechanism and the degree of freedom in designing the peripheral space of the link mechanism. This prevents enlargement in the size of the front portion of the vehicle. Additionally, this makes the front portion of the vehicle small in size.

In the vehicle according to a preferred embodiment, the vehicle body frame 21 includes the headstock 211 that turnably supports the upper cross portion 51 and the lower cross portion 52. A shape of a front lower cross portion 52a1 located forward of the headstock 211 and a shape of a rear lower cross portion 52a2 located rearward of the headstock 211 in relation to the direction of the lower right axis M6 are preferably different from each other. Specifically, the front lower cross portion 52a1 is larger than the rear lower cross portion 52a2.

According to the vehicle of a preferred embodiment of the present invention that includes the vehicle body frame 21 that can lean and two front wheels 31, 32, the shape of the front portion of the lower cross portion 52 located forward of the link supporting portion is different from the shape of the rear portion of the lower cross portion 52 located rearward of the link supporting portion, and therefore, it is possible to enhance the degree of freedom in designing the link mechanism while maintaining the function of the link mechanism. Additionally, this enables the movable range of the link mechanism 5 to be changed from the simple shape like a rectangular parallelepiped to a shape in which a lower rear portion is smaller than other areas. This enhances the degree of freedom in designing the space on the periphery of the rear portion of the lower cross portion 52. As a result of this, even though various on-board components having different sizes and the link mechanism 5 are disposed on the periphery of the steering shaft 60, it is possible to prevent further enlargement of the periphery of the steering shaft 60. By using this configuration, it is possible to enhance both the degree of freedom in designing the link mechanism and the degree of freedom in designing the peripheral space of the link mechanism. This prevents enlargement in the size of the front portion of the vehicle. Additionally, this makes the front portion of the vehicle small in size.

In the vehicle according to a preferred embodiment, the upper cross portion 51 includes the front upper cross portion 51A1 located forward of the headstock 211 in the direction of the upper right axis M3 and the rear upper cross portion 51A2 located rearward of the headstock 211 that extend in the same or substantially the same directions.

According to the vehicle of a preferred embodiment that includes the vehicle body frame 21 that can lean and two front wheels 31, 32, since the upper cross portion 51 includes the front upper cross portion 51A1 located forward of the headstock 211 and the rear upper cross portion 51A2 located rearward of the headstock 211, it is easy to control the balance between rigidity and shape in the upper cross portion 51. This enhances the degree of freedom in designing the link mechanism, while maintaining the function of the link mechanism. This enhances the degree of freedom in designing the lower peripheral portion of the steering shaft 60. This enhances the degree of freedom in designing the peripheral space of the lower cross portion 52. As a result of this, even though various on-board components having different sizes and the link mechanism 5 are disposed on the periphery of the steering shaft 60, it is possible to prevent further enlargement of the periphery of the steering shaft 60. By using this configuration, it is possible to enhance both the degree of freedom in designing the link mechanism and the degree of freedom in designing the peripheral space of the link mechanism. This prevents enlargement in the size of the front portion of the vehicle. Additionally, this makes the front portion of the vehicle small in size.

Alternatively, in the vehicle according to a preferred embodiment, a material of the upper cross portion 51 may be different from a material of the lower cross portion 52. The material of the upper cross portion 51 or the material of the lower cross portion 52 is changed, and therefore, a range of controlling the balance between rigidity and shape is expanded. This enhances the degree of freedom in designing the link mechanism, while maintaining the function of the link mechanism. Additionally, when the upper cross portion 51 whose rigidity is smaller than that of the lower cross portion 52 is made from a material having high rigidity, the shape of the upper cross portion 51 is small. As a result of this, it is possible to enhance the degree of freedom in designing the periphery of the steering shaft 60. As a result of this, even though various on-board components having different sizes and the link mechanism 5 are disposed on the periphery of the steering shaft 60, it is possible to prevent further enlargement of the periphery of the steering shaft 60.

Consequently, in the vehicle that includes the vehicle body frame 21 that can lean and two front wheels 31, 32, it is possible to prevent further enlargement in the size of the peripheral construction of the steering shaft 60 that is located above the two front wheels 31, 32 while maintaining the function of the link mechanism 5.

Figure 9:
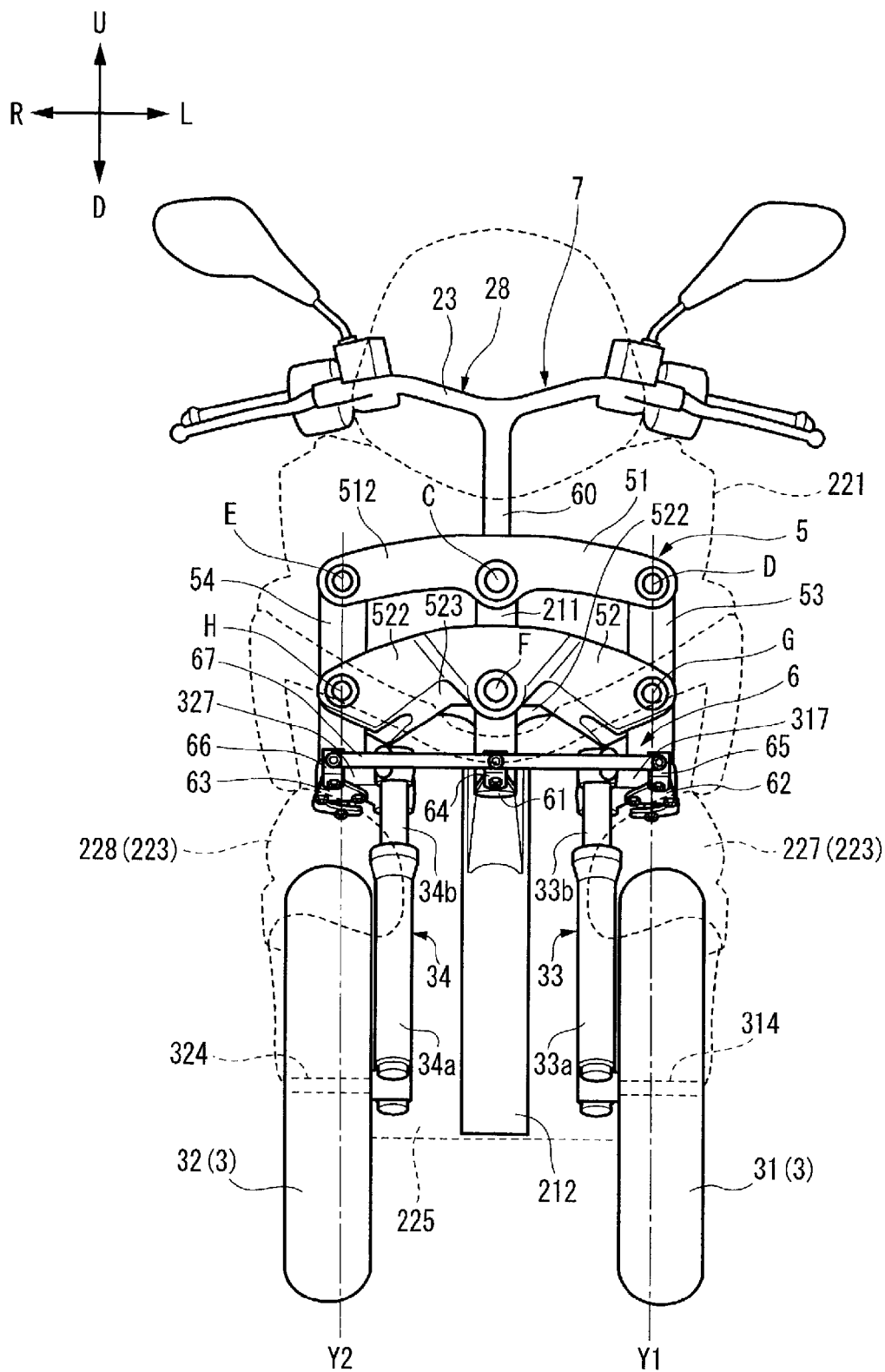
FIG. 9 is a front view of a vehicle according to a different modified preferred embodiment of the present invention.
Figure 10:
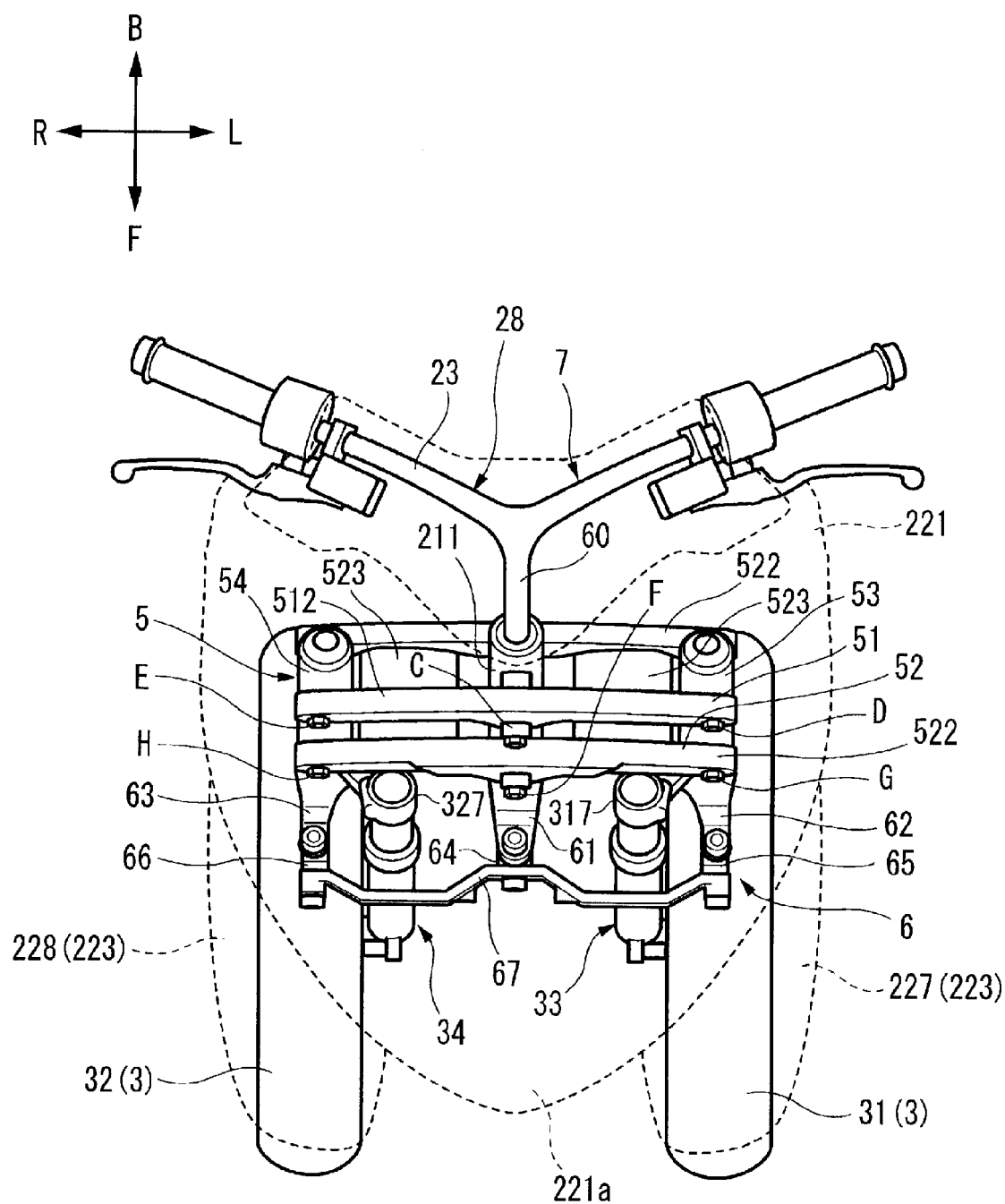
FIG. 10 is a plan view of the vehicle according to the different modified preferred embodiment of the present invention.

FIG. 9 is a front view of a vehicle according to a different modified preferred embodiment of the present invention. FIG. 10 is a plan view of the vehicle according to the different modified preferred embodiment of the present invention. In the figures, E denotes an upper right bearing 512 and a fastening member (a bolt, for example), C denotes an upper middle bearing 511 and a fastening member (a bolt, for example), D denotes an upper left bearing 512 and a fastening member (a bolt, for example), H denotes a lower right bearing 522 and a fastening member (a bolt, for example), F denotes a lower middle bearing 521 and a fastening member (a bolt, for example), and G denotes a lower left bearing 522 and a fastening member (a bolt, for example).

In this modified preferred embodiment, in an upper cross portion 51 and a lower cross portion 52, a middle portion is located above a right end portion and a left end portion when seen from the front of the vehicle. When seen from the front, the upper cross portion 51 and the lower cross portion 52 are curved. The upper cross portion 51 and the lower cross portion 52 have different shapes when seen from the front. The upper cross portion 51 is smaller than the lower cross portion 52 when seen from the front. The upper cross portion 51 and the lower cross portion 52 have different volumes. The volume of the upper cross portion 51 is smaller than that of the lower cross portion 52. Additionally, a relationship among a displacement X1, a displacement X2, a displacement X3, and a displacement X4 is preferably the same as that described in FIGS. 1 to 7B.

In this different modified preferred embodiment, the middle portion of the lower cross portion is located farther forward in a front-and-rear direction of the vehicle than the right end portion and the left end portion of the lower cross portion. In the lower cross portion, a thickness of the middle portion in the front-and-rear direction of the vehicle is larger than the thicknesses of the right end portion and the left end portion of the lower cross portion. The thickness of the right end portion of the lower cross portion in the front-and-rear direction of the vehicle is preferably the same as that of the left end portion thereof. In this manner, the balance of rigidity and shape between the upper cross portion and the lower cross portion is easily controlled. Consequently, it is possible to enhance the degree of freedom in designing the link mechanism while maintaining the function of the link mechanism in the vehicle that includes the vehicle body frame that can lean and two front wheels.

Additionally, a link supporting portion (a headstock) may include a single portion or a plurality of portions. When the link supporting portion includes a plurality of portions, the portions may be joined together through welding, bonding or the like. Alternatively, the portions may be joined together with fastening members such as bolts, rivets or the like.

The upper cross portion may include an upper front cross member including a single portion, an upper rear cross member including a single portion, and a connecting member provided between the upper front and rear cross members and that includes a plurality of portions. When the link supporting portion includes a plurality of portions, the portions may be joined together through welding, bonding or the like. Alternatively, the portions may be joined together with fastening members such as bolts, rivets or the like.

The lower cross portion may include a lower front cross member including a single portion, a lower rear cross member including a single portion, and a connecting member provided between the lower front and rear cross members and that includes a plurality of portions. When the link supporting portion includes a plurality of portions, the portions may be joined together through welding, bonding or the like. Alternatively, the portions may be joined together with fastening members such as bolts, rivets or the like.

Additionally, the right side portion and the left side portion may each include a single portion or a plurality of portions. When the link supporting portion includes a plurality of portions, the portions may be joined together through welding, bonding or the like. Alternatively, the portions may be joined together with fastening members such as bolts, rivets or the like. The right side portion and the left side portion may each include a portion that is disposed forward of the upper cross portion or the lower cross portion in the front-and-rear direction of the vehicle body frame and a portion that is disposed rearward of the upper cross portion or the lower cross portion in the front-and-rear direction of the vehicle body frame. The upper cross portion or the lower cross portion may be disposed between the portions that are disposed at the front of the right side portion and the left side portion and the portions that are disposed at the rear of the right side portion and the left side portion.

When rearward forces in the direction of rotational axes of the bearings are exerted at least on the supporting portions, the displacement X1 and the displacement X2 of the cross portion should be equal or substantially equal to each other, the displacement X3 and the displacement X4 of the cross portion should be equal or substantially equal to each other, the displacement X1 should be larger than the displacement X3, and the displacement X2 should be larger than the displacement X4. When forward forces in the direction of the rotational axes of the bearings are exerted on the supporting portions, the displacements of the cross portions may be different.

In the description made above, the forward movement of the front edge of the right end portion of the upper surface of the upper cross portion 51 in the front-and-rear direction of the vehicle body frame 21 is described as the upper right displacement X1, the forward movement of the front edge of the left end portion of the upper surface of the upper cross portion 51 in the front-and-rear direction of the vehicle body frame 21 is described as the upper left displacement X2, the forward movement of the front edge of the right end portion of the lower surface of the lower cross portion 52 in the front-and-rear direction of the vehicle body frame 21 is described as the lower right displacement X3, and the forward movement of the front edge of the left end portion of the lower surface of the lower cross portion 52 in the front-and-rear direction of the vehicle body frame 21 is described as the lower left displacement X4. However, in relation to the measuring method of the displacements X1 to X4, the present invention is not limited thereto.

For example, a forward movement of the front edge of the right end portion of the upper surface of the upper cross portion 51 in the front-and-rear direction of the vehicle body frame 21 may be measured as the upper right displacement X1, a forward movement of the front edge of the left end portion of the upper surface of the upper cross portion 51 in the front-and-rear direction of the vehicle body frame 21 may be measured as the upper left displacement X2, a forward movement of a rear edge of the right end portion of the lower surface of the lower cross portion 52 in the front-and-rear direction of the vehicle body frame 21 may be measured as the lower right displacement X3, and a forward movement of a rear edge of the left end portion of the lower surface of the lower cross portion 52 in the front-and-rear direction of the vehicle body frame 21 may be measured as the lower left displacement X4.

Alternatively, the upper right displacement X1 may be measured as a forward movement in the front-and-rear direction of the vehicle body frame 21 of the front edge of the upper surface of the upper cross portion 51 in a position that is spaced by an arbitrary distance D away from the upper right axis M3 in relation to the left-and-right direction of the vehicle body frame 21 as seen from the top in the up-and-down direction of the vehicle body frame 21. The upper right displacement X2 may be measured as a forward movement in the front-and-rear direction of the vehicle body frame 21 of the front edge of the upper surface of the upper cross portion 51 in a position that is spaced by an arbitrary distance D away from the upper left axis M2 in relation to the left-and-right direction of the vehicle body frame 21 as seen from the top in the up-and-down direction of the vehicle body frame 21. The lower right displacement X3 may be measured as a forward movement in the front-and-rear direction of the vehicle body frame 21 of the front edge of the lower surface of the lower cross portion 52 in a position that is spaced by an arbitrary distance D away from the lower right axis M6 in relation to the left-and-right direction of the vehicle body frame 21 as seen from the top in the up-and-down direction of the vehicle body frame 21. The lower left displacement X4 may be measured as a forward movement in the front-and-rear direction of the vehicle body frame 21 of the front edge of the lower surface of the lower cross portion 52 in a position that is spaced by an arbitrary distance D away from the lower left axis M5 in relation to the left-and-right direction of the vehicle body frame 21 as seen from the top in the up-and-down direction of the vehicle body frame 21.

Alternatively, a rear movement of a front edge of a right end portion of a lower surface of the upper cross portion 51 in the front-and-rear direction of the vehicle body frame 21 may be measured as the upper light displacement X1, a rearward movement of a front edge of a left end portion of the lower surface of the upper cross portion 51 in the front-and-rear direction of the vehicle body frame 21 may be measured as the upper left displacement X2, a forward movement of the front edge of the right end portion of the lower surface of the lower cross portion 52 in the front-and-rear direction of the vehicle body frame 21 may be measured as the lower right displacement X3, and a forward movement of the front edge of the left end portion of the lower surface of the lower cross portion 52 in the front-and-rear direction of the vehicle body frame 21 may be measured as the lower left displacement X4.

Additionally, the displacements X1 to X4 may be measured by a combination of the methods described above. For example, a forward movement of the front edge of the right end portion of the upper surface of the upper cross portion 51 in the front-and-rear direction of the vehicle body frame 21 may be measured as the upper right displacement X1, a forward movement of the front edge of the left end portion of the lower surface of the upper cross portion 51 in the front-and-rear direction of the vehicle body frame 21 may be measured as the upper left displacement X2, a rearward movement of a rear edge of a right end portion of an upper surface of the lower cross portion 52 in the front-and-rear direction of the vehicle body frame 21 may be measured as the lower right displacement X3, and a forward movement of the front edge of the left end portion of the lower surface of the lower cross portion 52 in the front-and-rear direction of the vehicle body frame 21 may be measured as the lower left displacement X4.

Alternatively, the upper right displacement X1 and the upper left displacement X2 may be measured as a rotational angle about the upper center axis 51C at an arbitrary point on the upper cross portion 51 as seen from the left-and-right direction of the vehicle body frame 21. The lower right displacement X3 and the lower left displacement X4 may be measured as a rotational angle about the lower center axis 52C at an arbitrary point on the lower cross portion 52 as seen from the left-and-right direction of the vehicle body frame 21.

For example, the upper right displacement X1 may be measured as a rotational angle of an upper front edge about the upper center axis 51C that is defined by the upper surface and a front surface of the upper cross portion 51. The upper left displacement X2 may be measured as a rotational angle of the upper front edge about the upper center axis 51C that is defined by the upper surface and the front surface of the upper cross portion 51. The lower right displacement X3 may be measured as a rotational angle of an upper front edge about the lower center axis 52C that is defined by the upper surface and a front surface of the lower cross portion 52. The lower left displacement X4 may be measured as a rotational angle of the upper front edge about the lower center axis 52C that is defined by the upper surface and the front surface of the lower cross portion 52.

The upper right displacement X1 may be measured as a clockwise rotational angle of the upper front edge of the upper cross portion 51 about the upper center axis 51C as seen from the right of the vehicle body frame 21. The upper left displacement X2 may be measured as a counterclockwise rotational angle of the upper front edge of the upper cross portion 51 about the upper center axis 51C as seen from the left of the vehicle body frame 21. The lower right displacement X3 may be measured as a counterclockwise rotational angle of the upper front edge of the lower cross portion 52 about the upper center axis 52C as seen from the right of the vehicle body frame 21. The lower left displacement X4 may be measured as a clockwise rotational angle of the upper front edge of the lower cross portion 52 about the lower center axis 52C as seen from the left of the vehicle body frame 21.

Alternatively, the upper right displacement X1 may be measured as a counterclockwise rotational angle of the upper front edge of the upper cross portion 51 about the upper center axis 51C as seen from the right of the vehicle body frame 21. The upper left displacement X2 may be measured as a clockwise rotational angle of the upper front edge of the upper cross portion 51 about the upper center axis 51C as seen from the right of the vehicle body frame 21. The lower right displacement X3 may be measured as a counterclockwise rotational angle of the upper front edge of the lower cross portion 52 about the upper center axis 52C as seen from the right of the vehicle body frame 21. The lower left displacement X4 may be measured as a counterclockwise rotational angle of the upper front edge of the lower cross portion 52 about the lower center axis 52C as seen from the right of the vehicle body frame 21.

The displacements X1 to X4 may be measured by various combinations of the methods described above. For example, the upper right displacement X1 may be measured as a clockwise rotational angle of the front upper edge of the upper cross portion 51 about the upper center axis 51C as seen from the right of the vehicle body frame 21. The upper left displacement X2 may be measured as a counterclockwise rotational angle of the upper front edge of the upper cross portion 51 about the upper center axis 51C as seen from the left of the vehicle body frame 21. The lower right displacement X3 may be measured as a clockwise rotational angle of the upper front edge of the lower cross portion 52 about the upper center axis 52C as seen from the left of the vehicle body frame 21. The lower left displacement X4 may be measured as a clockwise rotational angle of the upper front edge of the lower cross portion 52 about the lower center axis 52C as seen from the left of the vehicle body frame 21.

Additionally, the targets of the rotational angles to be measured are not limited to the upper front edges of the cross portions. Rotational angles at arbitrary points that are seen from the sides of the vehicle body frame 21 may be measured as the displacements X1 to X4.

In the preferred embodiments described above, the right side portion 54, the left side portion 53, and the headstock 211 are provided in positions that are superposed one on another when the vehicle body frame 21 is seen from the sides thereof. However, when the vehicle body frame 21 is seen from the side thereof, the headstock 211 may be provided in a different position from positions where the right side portion 54 and the left side portion 53 are provided in relation to the front-and-rear direction. Additionally, slant angles of the right side portion 54 and the left side portion 53 in relation to the up-and-down direction of the vehicle body frame 21 may differ from a slant angle of the headstock 211.

A vehicle according to preferred embodiments of the present invention is a vehicle that includes the vehicle body frame 21 that can lean and the front wheels 31, 32. The number of rear wheels is not limited to one, and hence, may be two. Whether or not the vehicle includes the body cover that covers the vehicle body frame 21 does not matter. As to the power source, an electric motor may be used in place of the engine.

When referred to in relation to the "direction," and the "member" in the description of preferred embodiments of the present invention, the term "along" also includes a case where the direction and the member are inclined within the range of about ±40 degrees, for example. When referred to in relation to the "direction" in the description of preferred embodiments of the present invention, the term "extend" also includes a case where the direction is inclined within the range of about ±40 degrees, for example.

The upper middle axis M1 and the lower middle axis M4 may be referred to as a middle axis as a general term therefor. The upper cross portion 51 and the lower cross portion 52 may be referred to as a cross portion as a general term therefor. The right side portion 54 and the left side portion 53 may be referred to as a side portion as a general term therefor.

In various preferred embodiments of the present invention, the link mechanism 5 may further include a cross portion in addition to the upper cross portion 51 and the lower cross portion 52. The upper cross portion 51 and the lower cross portion 52 are so called only from their relative positional relationship in the up-and-down direction. The upper cross portion 51 does not imply an uppermost cross portion in the link mechanism 5. The upper cross portion may indicate a cross portion that is positioned lower than an uppermost cross portion but is positioned higher than a different cross portion. The lower cross portion does not imply a lowermost cross portion in the link mechanism. The lower cross portion may indicate a cross portion that is positioned higher than a lowermost cross portion but is positioned lower than a different cross portion. In addition, the cross portion may include three portions including a middle portion that is supported on the vehicle body frame, a right portion that supports the right side portion, a left portion that supports the left side portion, and a right cross portion and left cross portion that are divided laterally in the left-and-right direction. In this manner, the upper cross portion and the lower cross portion may each include a plurality of portions as long as they still provide the link function. The link mechanism only has to include the upper cross portion and the lower cross portion.

Additionally, in the preferred embodiments described above, while the lower cross portion 52 is described as preferably including two portions that include the flat plate-shaped rear lower cross portion 52a2 and the portion that includes integrally the flat plate-shaped front lower cross portion 52a1 and the connecting portions 52b that connect the portion 52a1 and the rear lower cross portion 52a2 together, the present invention is not limited thereto. For example, by preparing the flat plate-shaped rear lower cross portion 52a2, the flat plate-shaped front lower cross portion 52a1, and the two connecting portions 52b as four independent portions, the lower cross portion 52 may be made up of four portions.

It is preferable that the test forces are exerted with the vehicle fixed in the upright state. The forward direction in relation to the direction of the lower right axis indicates a direction that is parallel or substantially parallel to the lower right axis and that is directed from the rear portion of the vehicle toward the front portion of the vehicle. The rearward direction in relation to the direction of the lower right axis indicates a direction that is parallel or substantially parallel to the lower right axis and that is directed from the rear portion of the vehicle toward the front portion of the vehicle. The upper right axis, the lower right axis, the upper left axis, and the lower left axis are parallel or substantially parallel to one another. Because of this, the forward direction in relation to the direction of the upper right axis, the forward direction in relation to the direction of the lower right axis, the forward direction in relation to the upper left axis, and the forward direction in relation to the lower left axis are the same or substantially the same direction. The rearward direction in relation to the direction of the upper right axis, the rearward direction in relation to the direction of the lower right axis, the rearward direction in relation to the upper left axis, and the rearward direction in relation to the lower left axis are the same or substantially the same direction.

The test forces may be exerted directly on the supporting portions of the side portions. Additionally, the test forces may be exerted on portions other than the supporting portions, which are portions on the side portions located on the upper right axis, the upper left axis, the lower right axis, and the lower left axis. The test forces may be exerted on the supporting portions or the side portions by way of portions other than the side portions.

When referred to in the description of preferred embodiments of the present invention, the description reading "the shape looks different" indicates that the shape of a certain portion looks different when the portion is seen in such a state that it is mounted on the vehicle. For example, the shape of a rectangular parallelepiped standing alone is construed as being different from the shape of the same rectangular parallelepiped when it is mounted on the vehicle with its posture turned through 90 degrees.

The terms and expressions that are used herein are used to describe the preferred embodiments of the present invention and hence should not be construed as limiting the scope of the present invention. It should be understood that any equivalents to the characteristic matters that are shown and described herein should not be excluded and that various modifications made within the scope of claims to be made later are permitted.

The present invention can be embodied in many different forms. The disclosure herein should be recognized as providing the preferred embodiments of the principle of the present invention. Based on the understanding that the preferred embodiments that are described and/or illustrated herein are not intended to limit the present invention thereto, several preferred embodiments are described and illustrated herein.

Several illustrated preferred embodiments of the present invention are described herein. The present invention is not limited to the various preferred embodiments that are described herein. The present invention can include every preferred embodiment that includes equivalent or similar elements, modifications, deletions, combinations (for example, combinations of the characteristics of the various preferred embodiments), improvements and/or alterations that those skilled in the art to which the present invention pertains can think of. Matters limited by claims should be construed widely based on terms that are used in the claims and should not be limited to the preferred embodiments described in this description or the prosecution of this patent application. Those preferred embodiments should be construed as non-exclusive. For example, in this disclosure, such terms as "preferred," "preferable," and "good" are non-exclusive terms and mean that "it is preferred but does not limit the present invention thereto," "it is preferable but does not limit the present invention thereto" and "it is good but does not limit the present invention thereto," respectively.

This patent application claims priority to Japanese Patent Application No. 2012-277219 filed on Dec. 19, 2012, Japanese Patent Application No. 2012-277220 filed on Dec. 19, 2012, and Japanese Patent Application No. 2013-138484 filed on Jul. 1, 2013, the entire contents of which are incorporated herein by reference.

While preferred embodiments of the present invention have been described above, it is to be understood that variations and modifications will be apparent to those skilled in the art without departing from the scope and spirit of the present invention. The scope of the present invention, therefore, is to be determined solely by the following claims.

The invention claimed is:

1. A vehicle that is driven by power from a power source, the vehicle comprising:
    a vehicle body frame;
    a left front wheel and a right front wheel disposed side by side in a left-and-right direction as seen from a front of the vehicle and that are configured to be steered;
    a right shock absorbing device that supports the right front wheel at a lower portion thereof and configured to absorb an upward displacement of the right front wheel in an up-and-down direction of the vehicle body frame;
    a left shock absorbing device that supports the left front wheel at a lower portion thereof and configured to absorb an upward displacement of the left front wheel in the up-and-down direction of the vehicle body frame;
    a link mechanism including:
        a right side portion that supports an upper portion of the right shock absorbing device so as turn about a right steering axis that extends in the up-and-down direction of the vehicle body frame;
        a left side portion that supports an upper portion of the left shock absorbing device so as to turn about a left steering axis that is parallel or substantially parallel to the right steering axis;
        an upper cross portion that includes a right end portion that supports an upper portion of the right side portion thereof so as to turn about an upper right axis that extends in a front-and-rear direction of the vehicle body frame via an upper right bearing, a left end portion that supports an upper portion of the left side portion so as to turn about an upper left axis that is parallel or substantially parallel to the upper right axis via an upper left bearing, and a middle portion supported on the vehicle body frame so as to turn about an upper middle axis that is parallel or substantially parallel to the upper right axis and the upper left axis via an upper middle bearing; and
        a lower cross portion that includes a right end portion that supports a lower portion of the right side portion so as to turn about a lower right axis that is parallel or substantially parallel to the upper right axis via a lower right bearing, a left end portion that supports a lower portion of the left side portion so as to turn about a lower left axis that is parallel or substantially parallel to the upper left axis via a lower left bearing, and a middle portion supported on the vehicle body frame so as to turn about a lower middle axis that is parallel or substantially parallel to the upper middle axis via a lower middle bearing;
    a steering shaft supported on the vehicle body frame between the right side portion and the left side portion in the left-and-right direction of the vehicle body frame, and including an upper end portion above the lower middle axis in the up-and-down direction of the vehicle body frame and that is turnable about a middle steering axis that extends in the up-and-down direction of the vehicle body frame;
    a handlebar provided at the upper end portion of the steering shaft; and
    a turning transmission mechanism configured to transfer a turning motion of the steering shaft to the right shock absorbing device and the left shock absorbing device according to an operation of the handlebar; wherein
    with the lower cross portion removed and the upper cross portion mounted, an upper right displacement of the upper cross portion that results when a forward or rearward test force in a direction of the lower right axis is exerted on the lower portion of the right side portion and an upper left displacement of the upper cross portion that results when a force that is equal or substantially equal in magnitude and direction as the test force is exerted on the lower portion of the left side portion are equal or substantially equal to each other;
    with the upper cross portion removed and the lower cross portion mounted, a lower right displacement of the lower cross portion that results when a force that is equal or substantially equal in magnitude and direction as the test force is exerted on the upper portion of the right side portion and a lower left displacement of the lower cross portion that results when a force that is equal or substantially equal in magnitude and direction as the test force is exerted on the upper portion of the left side portion are equal or substantially equal to each other;
    the upper right displacement of the upper cross portion is larger than the lower right displacement of the lower cross portion; and
    the upper left displacement of the upper cross portion is larger than the lower left displacement of the lower cross portion.

2. The vehicle according to claim 1, wherein a shape of the upper cross portion is different from a shape of the lower cross portion.

3. The vehicle according to claim 2, wherein a shape of the upper cross portion is smaller than a shape of the lower cross portion.

4. The vehicle according to claim 1, wherein a volume of the upper cross portion is different from a volume of the lower cross portion.

5. The vehicle according to claim 4, wherein a volume of the upper cross portion is smaller than a volume of the lower cross portion.

6. The vehicle according to claim 1, wherein a material of the upper cross portion is identical to a material of the lower cross portion.

7. The vehicle according to claim 1, wherein a material of the upper cross portion is different from a material of the lower cross portion.

8. The vehicle according to claim 1, wherein the vehicle body frame includes a link supporting portion that turnably supports the upper cross portion and the lower cross portion; and
    a shape of a front portion of the upper cross portion located forward of the link supporting portion in the direction of the upper right axis differs from a shape of a rear portion of the upper cross portion located rearward of the link supporting portion.

9. The vehicle according to claim 1, wherein the vehicle body frame includes a link supporting portion that turnably supports the upper cross portion and the lower cross portion; and
    a shape of a front portion of the lower cross portion located forward of the link supporting portion in the direction of the lower right axis differs from a shape of a rear portion of the lower cross portion located rearward of the link supporting portion.

10. The vehicle according to claim 1, wherein the vehicle body frame includes a link supporting portion that turnably supports the upper cross portion and the lower cross portion; and the upper cross portion includes an upper front portion located forward of the link supporting portion in the direction of the upper right axis and an upper rear portion located rearward of the link supporting portion in the direction of the upper right axis.

11. The vehicle according to claim 1, wherein the vehicle body frame includes a link supporting portion that turnably supports the upper cross portion and the lower cross portion; and the lower cross portion includes a lower front portion located forward of the link supporting portion in the direction of the lower right axis and a lower rear portion located rearward of the link supporting portion in the direction of the lower right axis.

12. The vehicle according to claim 1, wherein the vehicle body frame includes a link supporting portion that turnably supports the upper cross portion and the lower cross portion; and the upper cross portion or the lower cross portion is provided only either forward of or rearward of the link supporting portion and is not provided both forward of and rearward of the link supporting portion.

13. The vehicle according to claim 1, wherein a front end of the upper cross portion and a front end of the lower cross portion are arranged in different positions in relation to the direction of the upper right axis.

14. The vehicle according to claim 1, wherein a rear end of the upper cross portion and a rear end of the lower cross portion are arranged in different positions in relation to the direction of the upper right axis.

15. The vehicle according to claim 1, wherein the vehicle body frame includes a link supporting portion that turnably supports the upper cross portion and the lower cross portion; and the link supporting portion turnably supports the steering shaft.

\* \* \* \* \*